(12) United States Patent
Reynolds, IV et al.

(10) Patent No.: US 11,137,354 B2
(45) Date of Patent: Oct. 5, 2021

(54) METHODS AND APPARATUS FOR REDUCING MEASUREMENT ARTIFACTS OF SENSOR MEASUREMENTS

(71) Applicant: Broadley-James Corporation, Irvine, CA (US)

(72) Inventors: William E. Reynolds, IV, Irvine, CA (US); Robert J. Garrahy, Laguna Niguel, CA (US); Jared H. Nathanson, Mission Viejo, CA (US); Bradley Joseph Sargent, Mission Viejo, CA (US); Scott T. Broadley, Laguna Beach, CA (US)

(73) Assignee: BROADLEY-JAMES CORPORATION, Irvine, CA (US)

( * ) Notice: Subject to any disclaimer, the term of this patent is extended or adjusted under 35 U.S.C. 154(b) by 311 days.

(21) Appl. No.: 15/999,248

(22) PCT Filed: Feb. 16, 2017

(86) PCT No.: PCT/US2017/018228
§ 371 (c)(1),
(2) Date: Aug. 17, 2018

(87) PCT Pub. No.: WO2017/143101
PCT Pub. Date: Aug. 24, 2017

(65) Prior Publication Data
US 2020/0333255 A1 Oct. 22, 2020

Related U.S. Application Data

(60) Provisional application No. 62/297,099, filed on Feb. 18, 2016.

(51) Int. Cl.
*G01N 21/85* (2006.01)
*G01N 21/15* (2006.01)
*G01N 21/05* (2006.01)

(52) U.S. Cl.
CPC ......... *G01N 21/8507* (2013.01); *G01N 21/15* (2013.01); *G01N 2021/054* (2013.01)

(58) Field of Classification Search
CPC ............... G01N 21/15; G01N 21/8507; G01N 2021/054; G01N 21/274; G01N 21/643;
(Continued)

(56) References Cited

U.S. PATENT DOCUMENTS 4,768,879 A 9/1988 McLachlan et al.
6,471,136 B1 * 10/2002 Chatterjee ............. F25D 17/042
237/2 B
(Continued)

FOREIGN PATENT DOCUMENTS

EP 1 659 394 A2 5/2006
GB 2 283 091 A 4/1995
(Continued)

OTHER PUBLICATIONS

International Search Report and Written Opinion dated May 30, 2017 for Application No. PCT/US2017/018228.

*Primary Examiner* — Tri T Ton
(74) *Attorney, Agent, or Firm* — Knobbe, Martens, Olson & Bear, LLP

(57) ABSTRACT

Methods and apparatus for reducing measurement artifacts of sensor measurements are disclosed herein. An aspect of the invention includes a measurement device configured to reduce measurement inaccuracies in a sample. The measurement device comprises a measurement probe comprising a sensor configured to detect a characteristic of the sample and generate a measurement signal based thereon. The measurement device further comprises a memory configured to store instructions for applying a filter to the measurement signal. The measurement device also further comprises a filtering module configured to process the instructions for applying (Continued)

the filter to the measurement signal to generate a filtered output with reduced measurement inaccuracies.

19 Claims, 11 Drawing Sheets

(58) Field of Classification Search
CPC .. G01N 21/645; G01N 21/783; G01N 27/404; G01N 27/00
USPC .............................. 356/335–343, 39–42, 73
See application file for complete search history.

(56) References Cited

U.S. PATENT DOCUMENTS

| | | |
|---|---|---|
| 2006/0061765 A1 | 3/2006 | Rezvani et al. |
| 2008/0166037 A1* | 7/2008 | Mandrachia .......... G06T 7/0002 382/133 |
| 2014/0190826 A1* | 7/2014 | Bondzio .............. G01N 21/643 204/406 |
| 2014/0296112 A1* | 10/2014 | O'Driscoll ............ G01J 3/0208 506/39 |
| 2016/0183805 A1* | 6/2016 | Kobayashi ........... G01N 21/274 356/243.1 |

FOREIGN PATENT DOCUMENTS

| | | |
|---|---|---|
| JP | 2012/150076 A | 8/2012 |
| WO | WO 2006/136786 A1 | 12/2006 |
| WO | WO 2014/100725 A1 | 6/2014 |

\* cited by examiner

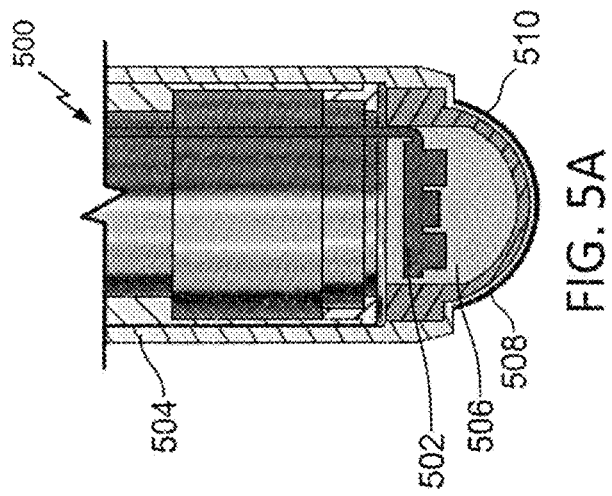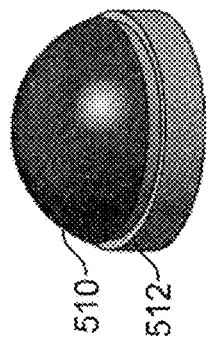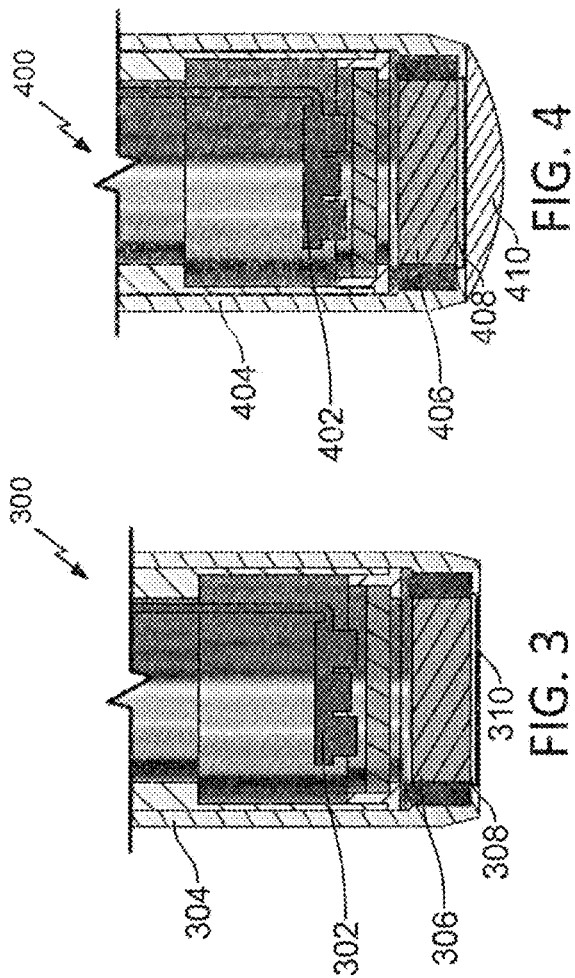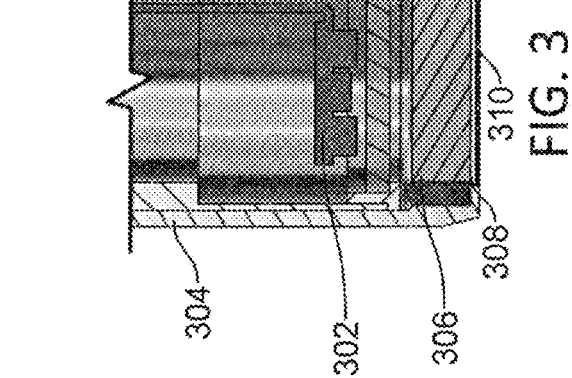

METHODS AND APPARATUS FOR REDUCING MEASUREMENT ARTIFACTS OF SENSOR MEASUREMENTS

RELATED APPLICATIONS

This application is a U.S. National Phase under 35 U.S.C. § 371 of the International Patent Application No. PCT/US2017/018228, filed Feb. 16, 2017, and published on Aug. 24, 2017 as WO 2017/143101, which claims priority to U.S. Provisional Application No. 62/297,099, filed Feb. 18, 2016.

BACKGROUND

Field of the Invention

The present invention relates to measurement systems and devices. More particularly, the invention relates to immersible dissolved oxygen (DO), carbon dioxide ($CO_2$), and optical pH probes used in various industries.

Description of the Related Art

A dissolved oxygen ("DO") probe is an example of a gas sensor used to measure the amount of dissolved oxygen in liquids. Two general types of DO sensing technologies exist: optical based sensing methods and electrochemical methods. Optical DO probes generally measure luminescence (e.g., fluorescence) from a surface which is in contact with sample. In some embodiments, the surface comprises a chemical compound (e.g., a ruthenium or Pt compound) that will fluoresce when exposed to light. The fluorescence is affected by the presence of oxygen, thereby providing a means for measuring the amount of oxygen present in the sample. The optical DO probes generally measure either the duration of the fluorescence or the intensity of the fluorescence. A $CO_2$ probe is a gas sensor used to measure an amount of $CO_2$ in liquids. An optical pH sensor measures the pH of a sample.

Electrochemical DO probes, both polarographic and galvanic, measure electrical current generated by the reduction of oxygen by a cathode. The electrochemical probes consist of an anode and a cathode in an electrolyte solution that is capped by an oxygen permeable membrane. Dissolved oxygen molecules in the sample diffuse through the membrane to the sensor at a rate proportional to an $O_2$ partial pressure difference across the membrane. The oxygen molecules are then reduced at the cathode, producing an electrical current that is measured by the associated instrumentation. Because oxygen is rapidly reduced at the cathode, the $O_2$ partial pressure under the membrane is essentially zero, and thus the rate of oxygen diffusing through the membrane is proportional to the partial pressure of oxygen outside the membrane.

In use, DO probes may be part of a system to regulate an amount of dissolved oxygen that exists in the liquid sample being measured. Similarly, $CO_2$ and optical pH probes may be used in systems to regulate carbon dioxide amounts or pH levels, respectively, and these probes may be subject to measurement artifacts caused by bubbles in the sample being measured. For example, the DO probe can be placed into a bioreactor as part of a system to maintain the oxygen level in the bioreactor at a level that is optimal for microbial or mammalian cell growth. However, oxygen or air bubbles added to the sample to maintain optimal oxygen levels may impact or adhere to the sensing surface (e.g. the fluorescent surface of an optical probe, or the oxygen permeable membrane of an electrochemical probe) of the DO probe. This can cause an unwanted measurement artifact in the oxygen readings generated by the DO probe because the concentration of the oxygen within the accumulated bubbles is not representative of the dissolved oxygen content of the sample. This can lead to the system erroneously increasing or decreasing the amount of oxygen supplied to the sample, resulting in too much or too little dissolved oxygen being present in the sample.

SUMMARY OF THE INVENTION

Methods and apparatus for minimizing or reducing the potential for bubbles to collect on the sensing surface (e.g., fluorescent surface or oxygen permeable membrane) of DO probes and for minimizing and reducing the measurement artifacts and effects caused by bubbles when they do impact or adhere to the sensing surface of the DO probes, are disclosed herein. The implementations disclosed herein each have several innovative aspects, no single one of which is solely responsible for the desirable attributes of the invention. Without limiting the scope, as expressed by the claims that follow, the more prominent features will be briefly disclosed here. After considering this discussion, one will understand how the features of the various implementations provide several advantages over current dissolved oxygen (DO) probes.

An aspect of the invention includes a measurement device configured to reduce measurement inaccuracies in a sample. The measurement device comprises a measurement probe comprising a sensor configured to detect a characteristic of the sample and generate a measurement signal based thereon. The measurement device further comprises a memory configured to store instructions for applying a filter to the measurement signal. The measurement device also further comprises a filtering module configured to process the instructions for applying the filter to the measurement signal to generate a filtered output with reduced measurement inaccuracies.

In some embodiments, the measurement inaccuracies are caused by gas bubbles within the sample comprising an aqueous solution. In some embodiments, the filter is a bubble effect filter configured to reduce measurement inaccuracies caused by impacts or adherences of the gas bubbles with the probe. In some embodiments, the sensor comprises a sensing surface positioned on a distal end, the sensing surface exposed to the sample and configured to facilitate a passing of the gas bubbles away from the sensing surface. In some embodiments, the sensing surface is domed or at an angle that is less than 90 degrees to the axis of a length of the measurement device. In some embodiments, the domed or angled sensing surface comprises a replaceable cap. In some embodiments, the domed or angled sensing surface having the replaceable cap is molded from a translucent or transparent polymer. The translucent or transparent polymer may be one of: glass, plastic, or silicone rubber. In some embodiments, the sensor of the measurement probe is an optical, fluorescence based, gas sensor comprising one or more light emitter and light detector circuits. In some embodiments, the measurement probe is an electrochemical gas sensor comprising a cathode, an anode, and a gas permeable layer positioned to be in contact with the sample, an electrolyte chamber. In some embodiments, the measurement probe is configured to measure an amount of dissolved oxygen or dissolved carbon dioxide in the sample. In some embodiments, the instructions comprise instructions for the filtering module to generate a rate of change of the measurement signal and compare an absolute value of the rate of change to a threshold value. In some embodiments, the instructions further comprise instructions for the filtering module to maintain an output of a previous measurement signal when the generated rate of change is greater than the threshold value and output the measurement signal when the generated rate of change is less than the threshold value. In some embodiments, the instructions further comprise instructions for the filtering module to initiate a timer in conjunction with the rate of change and the threshold value, the timer configured to cause the filtering module to release the signal hold after the generated rate of change is less than the threshold value and after a subsequent user-set timer interval has elapsed. In some embodiments, the instructions further comprise instructions for the filtering module to hold the generated filtered output at a previously output value when the user-set timer interval has not elapsed. In some embodiments, the instructions comprise one or more user adjustable parameters to tune the filter based on the sample. In some embodiments, the instructions comprise instructions for the filtering module to count a number of measurement inaccuracy events within a period of time. In some embodiments, the instructions further comprise instructions for the filtering module to compare the number of events to an event threshold value, set a parameter set for the filtering module to a first set when the number of events is equal to or less than the event threshold value, and set the parameter set of the filtering module to a second set when the number of events is above the event threshold value. In some embodiments, a silicone rubber coating exists on the cap coating the cap. In some embodiments, the measurement probe comprises one of a dissolved oxygen probe, a carbon dioxide probe, or a pH probe.

Another aspect of the invention includes a method for reducing measurement inaccuracies in a sample. The measurement device comprises a measurement probe comprising a sensor configured to detect a characteristic of the sample and generate a measurement signal based thereon. The measurement device further comprises a memory configured to store instructions for applying a filter to the measurement signal. The measurement device also further comprises a filtering module configured to process the instructions for applying the filter to the measurement signal to generate a filtered output with reduced measurement inaccuracies.

In some embodiments, the sensor comprises a sensing surface positioned on a distal end, the sensing surface exposed to the sample and configured to facilitate a passing of the gas bubbles away from the sensing surface. In some embodiments, the sensing surface is domed or at an angle that is less than 90 degrees to the axis of a length of the measurement probe. In some embodiments, the domed or angled sensing surface comprises a replaceable cap. In some embodiments, the domed or angled sensing surface having the replaceable cap is molded from a translucent or transparent polymer. In some embodiments, the translucent or transparent polymer is one of: glass, plastic, or silicone rubber. In some embodiments, the sensor of the measurement probe is an optical, fluorescence based, gas sensor comprising one or more light emitter and light detector circuits. In some embodiments, the measurement probe is an electrochemical gas sensor comprising a cathode, an anode, and a gas permeable layer positioned to be in contact with the sample, and an electrolyte chamber. In some embodiments, the method further comprises measuring, via the measurement probe, an amount of dissolved oxygen or dissolved carbon dioxide in the sample. In some embodiments, the filter is configured to generate a rate of change of the measurement signal and compare an absolute value of the rate of change to a threshold value. In some embodiments, the filter is further configured to maintain an output of a previous measurement signal when the generated rate of change is greater than the threshold value and output the measurement signal when the generated rate of change is less than the threshold value. In some embodiments, the filter is further configured to initiate a timer in conjunction with the rate of change and the threshold value, the timer configured to cause the filter to release the signal hold after the generated rate of change is less than the threshold value and after a subsequent user-set timer interval has elapsed. In some embodiments, the filter is further configured to hold the generated filtered output at a previously output value when the user-set timer interval has not elapsed. In some embodiments, the filter comprises one or more user adjustable parameters to tune the filter based on the sample. In some embodiments, the filter comprises counting a number of measurement inaccuracy events within a period of time. In some embodiments, the filter is further configured to compare the number of events to an event threshold value, set a parameter set for the filter to a first set when the number of events is equal to or less than the event threshold value and set the parameter set of the filter to a second set when the number of events is above the event threshold value. In some embodiments, the method further comprises a silicone rubber coating on the cap coating the cap. In some embodiments, the measurement probe comprises one of a dissolved oxygen probe, a carbon dioxide probe, or a pH probe.

Another aspect of the invention includes a method for reducing measurement inaccuracies in a sample. The method comprises detecting, via a sensor, a characteristic of the sample. The method also comprises generating a measurement signal based on the detected characteristic. The method further comprises applying, via a filtering module, a filter, stored in a memory, to the measurement signal, the filter configured to generate a filtered output having reduced measurement inaccuracies as compared to the measurement signal.

Another aspect of the invention includes another measurement device configured to reduce measurement inaccuracies in a sample. The measurement device comprises means for detecting a characteristic of the sample and generating a measurement signal based thereon. The measurement device further comprises means for storing instructions for applying a filter to the measurement signal. The measurement device also comprises means for applying a filter, the filtering means configured to process instructions for applying the filter to the measurement signal to generate a filtered output with reduced measurement inaccuracies as compared to the measurement signal.

In some embodiments, the detecting means comprises a sensing surface positioned on a distal end, the sensing surface exposed to the sample and configured to facilitate a passing of the gas bubbles away from the sensing surface. In some embodiments, the sensing surface is domed or at an angle that is less than 90 degrees to the axis of a length of the measurement device. In some embodiments, the domed or angled sensing surface comprises a replaceable cap. In some embodiments, the domed or angled sensing surface having the replaceable cap is molded from a translucent or transparent polymer. In some embodiments, the translucent or transparent polymer is one of: glass, plastic, or silicone rubber. In some embodiments, the detecting means is an optical, fluorescence based, gas sensor comprising one or more light emitter and light detector circuits. In some embodiments, the detecting means is an electrochemical gas sensor comprising a cathode, an anode, and a gas permeable layer positioned to be in contact with the sample, and an electrolyte chamber. In some embodiments, the detecting means is configured to measure an amount of dissolved oxygen or dissolved carbon dioxide in the sample. In some embodiments, the filtering means is further configured to generate a rate of change of the measurement signal and compare an absolute value of the rate of change to a threshold value. In some embodiments, the filtering means is further configured to maintain an output of a previous measurement signal when the generated rate of change is greater than the threshold value and output the measurement signal when the generated rate of change is less than the threshold value. In some embodiments, the filtering means is further configured to initiate a timer in conjunction with the rate of change and the threshold value, the timer configured to cause the filtering mean to release the signal hold after the generated rate of change is less than the threshold value and after a subsequent user-set timer interval has elapsed. In some embodiments, the filtering means is further configured to hold the generated filtered output at a previously output value when the user-set timer interval has not elapsed. In some embodiments, the filtering means comprises one or more user adjustable parameters to tune the filter based on the sample. In some embodiments, the filtering means is further configured to count a number of measurement inaccuracy events within a period of time. In some embodiments, the filtering means is further configured to compare the number of events to an event threshold value, set a parameter set for the filtering means to a first set when the number of events is equal to or less than the event threshold value, and set the parameter set of the filtering means to a second set when the number of events is above the event threshold value. In some embodiments, the apparatus further comprises a means for coating the cap. In some embodiments, the detecting means comprises one of a dissolved oxygen probe, a carbon dioxide probe, or a pH probe. In some embodiments, the filtering module is configured to identify an amount of time during which the filtered output is generated within a period of time and wherein at least one parameter of the filtering module is adjusted based on the identified amount of time.

BRIEF DESCRIPTION OF THE DRAWINGS

The herein-mentioned aspects, as well as other features, aspects, and advantages of the present technology will now be described in connection with various implementations, with reference to the accompanying drawings. The illustrated implementations, however, are merely examples and are not intended to be limiting. For example, additional components not shown herein may be included. Throughout the drawings, similar symbols typically identify similar components, unless context dictates otherwise. Note that the relative dimensions of the following figures may not be drawn to scale.

FIG. 3 depicts an example of a prior art optical DO probe.

FIG. 4 depicts an example of a DO probe having a curved, solid material positioned between the sensing surface of the DO probe and the sample having its oxygen content measured.

FIG. 5A depicts an example of a DO probe having a domed exterior surface on which the sensing surface may be mounted such that the sensing surface itself is curved but still directly exposed to the sample.

FIG. 5B depicts an example of a three-dimensional perspective view of the domed exterior surface of the DO probe of FIG. 5A.

DETAILED DESCRIPTION

Figure 1A:
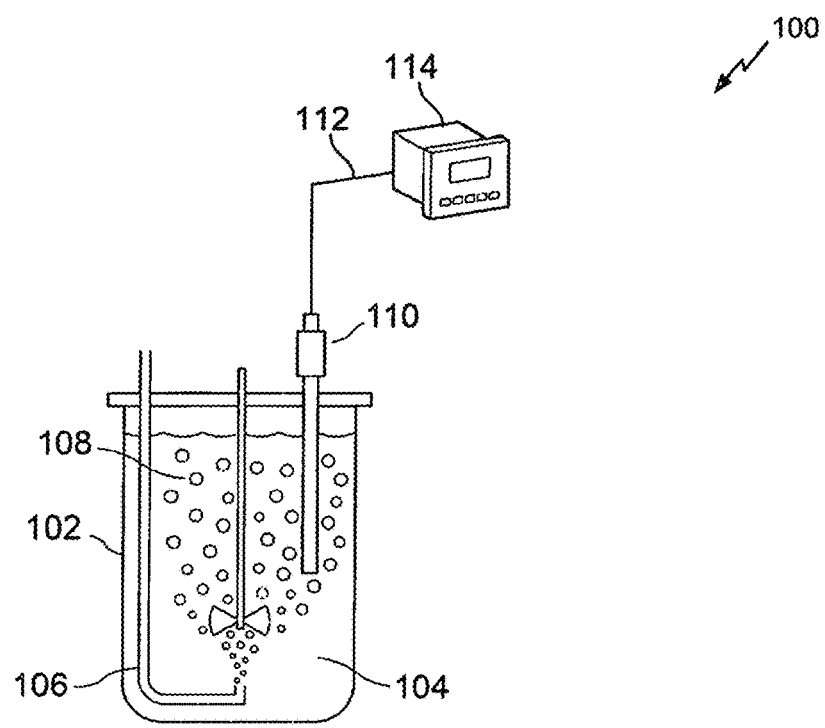
FIG. 1A depicts a DO probe as used in a bioprocess (or similar) system.

There is a need for a dissolved oxygen ("DO") measurement probe or sensor, a $CO_2$ probe or sensor, or a pH probe or sensor for use in bioprocess and other process monitoring industries that minimizes unwanted measurement artifacts created by gas bubbles. As described in more detail below, a leading cause of DO measurements artifacts is the impact or adhering of bubbles to the sensing surface (e.g. the oxygen sensitive surface or oxygen permeable membrane) of the DO measurement probe. For example, sparging of gas through an aqueous sample may introduce bubbles into the sample. As these bubbles rise to the top or surface of the sample, the bubbles can pass the DO probe installed within the sample. A vertically installed DO probe typically has a horizontal sensing surface. As the bubbles impact the horizontal sensing surface, some of the bubbles may adhere to the sensing surface. Stirring or otherwise agitating the sample may not be sufficient to dislodge the adhered bubbles. Various embodiments, as described herein, may be designed to modify the sensing surface of the DO probe to minimize the quantity of bubbles that impact or adhere to the sensing surface. Alternatively, or additionally, algorithms or other software components may minimize the unwanted measurement artifacts and the effects of the impacting or adhered bubbles on the DO measurements by modifying the signal from the DO probe to adjust for spurious readings. As described herein, a bubble may impact the DO probe when the bubble is in contact with the DO probe for a relatively short period of time, e.g., less than 20 seconds. In some embodiments, the "impact" may be between zero and 5 seconds, 10 seconds, 15 second, or any number therebetween. The bubble may adhere to the DO probe when it is in contact with the DO probe for a relatively longer period of time, e.g., greater than 20 seconds. In some embodiments, a bubble adheres to the DO probe when the duration of contact with the DO probe exceeds the timers used in filtering or processing.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

To assist in the description of the devices and methods described herein, some relational and directional terms are used. "Connected" and "coupled," and variations thereof, as used herein include direct connections, such as being contiguously formed with or attached directly to, on, within, etc. another element, as well as indirect connections where one or more elements are disposed between the connected elements. "Connected" and "coupled" may refer to a permanent or non-permanent (i.e., removable) connection.

"Secured" and variations thereof as used herein include methods by which an element is directly fastened to another element, such as being glued, screwed or otherwise affixed directly to, on, within, etc. another element, as well as indirect means of attaching two elements together where one or more elements are disposed between the secured elements.

A "smart" probe or sensor may comprise a probe with an embedded memory chip (or similar memory structure) that can be written to and read by another device. When the smart probe is calibrated with associated instrumentation or devices, smart probe correction factors may be stored to the smart probe's memory. In this manner the smart probe now "knows" its own correction factors (e.g., correction factors that account for calibration values). Thus, when that calibrated smart probe is disconnected from a first device and reconnected to a second device, the second device may read the stored correction factors of the probe and apply them to the smart probe output.

"Proximal" and "distal" are relational terms used herein to describe position. For clarity purposes only, in this disclosure, position is viewed from the perspective of an individual operating a measurement device positioned partially within a processing vessel. The portion of the measurement device located external to the vessel is viewed as being closest, and therefore, most proximal to the operator. The portion of the device positioned within the container is more distally located.

Dissolved oxygen ("DO") probes may be used as part of a system to regulate an amount of oxygen that exists in a liquid or gas sample. For example, the sample may include dissolved oxygen that is consumed by a reaction in a liquid media. As the oxygen is consumed, oxygen may be added to the liquid sample, for example by "sparging," which may comprise the technique of adding oxygen (as pure oxygen or as part of a mixture, such as air) to the system via bubbles that are introduced to the liquid sample near the bottom of a container holding the liquid sample. The DO probes may be used to control sparging to maintain the dissolved oxygen levels of the sample within a desired range.

In one example, DO probes may be used in systems that cultivate cells, for example microbial, yeast, mammalian or other types of cells. For example, mammalian cells may be commercially propagated in large quantities within bioreactors that are filled with an aqueous media that typically contains glucose and other nutrients. These mammalian cells may comprise altered DNA that causes the cells to produce a complex large molecule with therapeutic value, such as so called "biologicals." The mammalian cell type most commonly used for this production technique may be the Chinese Hamster Ovary cell ("CHO"). After large quantities of the CHO cells are produced, the CHO cells are harvested and further processed to extract the desired biological.

When producing the CHO cells to generate the desired biologicals, conditions within the bioreactor are typically carefully controlled to allow the CHO cells to thrive and divide in a liquid media. As the CHO cells divide in larger quantities, the target biological is produced in larger quantities. During the production processes, conditions within the bioreactor are typically controlled for temperature, aeration, pH, agitation, and the addition of nutrients. These conditions are optimized to allow the CHO cells to thrive and divide.

The CHO cells may consume oxygen as part of the "thrive and divide" production process. Accordingly, controlling the oxygen concentration of the bioreactor within a desired range may be desirable to ensure proper CHO cell health and reproduction. Aeration, or sparging, may be used to add oxygen to the media to control the oxygen concentration within the bioreactor. An optimum oxygen concentration may comprise the oxygen concentration at which CHO cells' health and reproduction is maximized. The optimum oxygen concentration may be obtained by controlling a supply of gas (e.g., sterile air or oxygen) that is introduced to the media at the bottom of the bioreactor. The gas may be introduced by sparging as a plurality of bubbles that bubble up through the liquid aqueous media before exiting through a filtered port at the top of the bioreactor. As the CHO cells consume the dissolved oxygen in the bioreactor media, these sparged bubbles may replenish the dissolved oxygen within the media. By utilizing an in-situ DO probe, a bioreactor control system may maintain the DO concentration within the bioreactor at any desired level. In some bioprocess applications, the dissolved oxygen concentration is typically expressed in units of percent saturation (% SAT). In some embodiments, the gas introduced via sparging may be sterile air, comprising approximately 21% pure oxygen. In some embodiments, the gas introduced via sparging may be 100% pure oxygen. In some embodiments, the gas introduced via sparging may comprise any other concentration of pure oxygen.

The bubbles resulting from the sparging may impact and/or adhere to a sensing surface of the DO probe (e.g. the oxygen sensitive surface of an optical DO probe, or the oxygen-permeable membrane of an electrochemical DO probe). This may cause the DO probe to measure the oxygen content of the bubble and not of the aqueous media surrounding the DO probe and the bubble. This problem can arise when using vertically mounted DO probes, where the rising bubbles may impact and/or adhere to the DO probe's sensing surface which is oriented parallel to the bottom surface of the vessel in the stream of rising sparge bubbles. If the impacting or adhered bubble has a higher concentration of oxygen than the surrounding media, the DO probe may report an oxygen "spike" resulting from the higher oxygen concentration of the bubble. When the bioreactor control system is relying on the DO probe measurement for its control of the oxygen content of the media, the bioreactor control system may respond to the spike by reducing the sparge rate. The lowering of the sparge rate may result in a reduced oxygen concentration in the media, which may stress the CHO cells (or other organism in the bioreactor) in an undesirable way. If that impacting or adhered bubble has a lower concentration of oxygen than the surrounding media, then the DO probe may report an oxygen "drop" resulting from the lower oxygen concentration of the bubble, which may result in the control system erroneously increasing the sparge rate, leading to an undesired increase in oxygen saturation in the media. Accordingly, at best the bubbles that impact and/or adhere to the DO probe's sensing surface may cause an oscillating supply of oxygen to the bioreactor. At worst, the bubbles can lead to prolonged sparge shutdown, oxygen starvation and death of the CHO cells (or alternatively extreme oversupply of oxygen), resulting in a failing bioreactor run.

Various physical embodiments are disclosed herein that adjust the horizontal presentation of the sensing surface of the DO probe to the gas bubbles introduced by sparging or any other process. Some of the physical embodiments disclosed may comprise newly designed DO probes having the structures and optional processor instructions for reducing measurement artifacts disclosed herein integrated therewith. In some embodiments, the physical embodiments may comprise newly designed caps, covers, or "add-on" components that may be added to or coupled with existing DO probes. In some embodiments, the add-on components may comprise one or more modules comprising processor instructions for reducing measurement artifacts configured to filter (or otherwise account for) the oxygen concentration spikes or drops caused by impacting or adhered bubbles. Accordingly, in some embodiments, these one or more modules may communicate with other circuitry of the DO probe or the bioreactor control system (or similar control system) to convey the processor instructions for reducing measurement artifacts for application to the DO probe measurements. In some embodiments, the physical features and processor instructions for reducing measurement artifacts described herein may be integrated within a smart DO probe or any other type of DO probe. In some embodiments, the processor instructions for reducing measurement artifacts may be separately programmed or stored in the DO probe firmware or memory.

By modifying or reducing the horizontal presentation of the sensing surface, the buoyancy of the bubbles may provide sufficient force to prevent the bubbles from adhering to the sensing surface. Additionally, or alternatively, various 3D shapes may be used to further vary the horizontal presentation of the sensing surface. For example, the sensing surface may be outwardly curved (e.g., convex), conical, or pyramidal, which may prevent bubbles from adhering to the sensing surface. Additionally, or alternatively, the sensing surface may be coated with a material that reduces or electrically charged to reduce the ability for the bubbles to impact or adhere to the sensing surface.

In some embodiments, there may exist a 3D component positioned between the sensing surface and the sample (e.g., mounted to the exterior of the sensing surface) that introduces a non-horizontal surface to the rising bubbles and to which the bubbles have difficulty adhering. In some embodiments, these 3D components may be the outwardly curved, conical, pyramidal, or spherical shapes disclosed herein. These components are formed from an oxygen diffusing material so as to allow the sensor to continue to measure the diffused oxygen concentration in the sample while minimizing measurement artifacts from the bubbles. Such embodiments may allow the sensing surface to remain horizontal in relation to the axis of the DO probe but still reduce the amount of bubbles that impact or adhere to the sensing surface.

As will be seen from the Figures, by creating a 3D cap or component that will be positioned between the sensing surface and the sample, the effects of adhering air bubbles may be essentially eliminated, as the component may prevent the oxygen bubble from adhering to the 3D component, thus reducing its ability to influence the sensing surface. Additionally, the components that modify or reduce the horizontal presentation of the sensing surface may also reduce the ability or likelihood of bubbles impacting the sensing surface and thus minimizing measurement artifacts caused by impacting bubbles.

The processor instructions for reducing measurement artifacts may be programmed within the DO probe. The processor instructions for reducing measurement artifacts may be configured to minimize the effects of impacting or adhered bubbles on the measurements made by the DO probe. For example, the processor instructions for reducing measurement artifacts may be configured to minimize any peaks or valleys in the DO measurements of the DO probe by filtering (or similar methods). In some embodiments, the processor instructions for reducing measurement artifacts may output an average DO measurement over a period of time. In some embodiments, the processor instructions for reducing measurement artifacts may exclude DO measurements that fall outside a given threshold of previous DO measurements. For example, if the previous ten DO measurements were within ten percent of each other, the processor instructions for reducing measurement artifacts may exclude a DO measurement that is fifty percent different from any of the previous DO measurements. In some embodiments, the processor instructions for reducing measurement artifacts may be combined with the various physical embodiments disclosed herein. In some embodiments, the processor instructions for reducing measurement artifacts and the various physical embodiments may be separately incorporated into the DO probes.

In some embodiments, the smart DO probe may include a "bubble spike avoidance" or similar processor instructions or algorithm for reducing measurement artifacts. The processor instructions for reducing measurement artifacts may include (or may be included with) a smart circuit of the DO probe. The smart circuit of the DO probe may cache measurement data of the DO probe, produce a rolling average of the measured data (if desired), and implement the bubble detection and correction processor instructions. Accordingly, the smart DO probe itself can provide a sophisticated set of instructions to implement the "bubble filter" algorithm to remove bubble-caused measurement artifacts from the measurement signal. The bubble filter (or bubble effect filter) may comprise an algorithm or instruction set that reduces the effect of gas bubbles that impact or adhere to the DO probe on the signal output by the DO probe. The bubble filter may allow the DO probe to maintain or hold an output corresponding to an output prior to the impact or adherence of the gas bubble(s) so that the impacts or adherences cause less fluctuation in the output of the DO probe.

FIG. 1A depicts a DO probe as used in a bioprocess (or similar) system. The system 100 includes a vessel or similar container 102 that includes an aqueous sample 104. Within the vessel 102 and sample 104 is a device (e.g., an open ended sparger tube) 106 that introduces bubbles (air, pure oxygen, or other gas mixture containing oxygen) 108 for diffusion in the sample 104 as oxygen is consumed from the sample 104. The sparger 106 is shown positioned at the bottom of the sample 104 in the vessel 102. Positioned above the sparger 106 with a sensing end (e.g., distal end) within the sample 104 and the vessel 102 is the dissolved oxygen (DO) probe 110. The DO probe 110 is coupled to an external data or control system 114 via communication link 112. In some embodiments, the sparger 106 may be positioned at any location within the sample 104 and the vessel 102 and the DO probe 110 is located with the sensing end within the sample 104.

As the sparger 106 introduces oxygen to the sample 104 via the bubbles 108, the bubbles 108 rise to the top of the sample 104. Accordingly, the bubbles 108 contact the bottom of the DO probe 110, as shown in the FIG. 1A. Due to the relatively flat surface of the DO probe 110, one or more of the bubble 108 may get stuck, adhere or otherwise collect on the surface. When this happens, the oxygen content of the bubble 108 may cause an unwanted measurement artifact where the measurement(s) generated by the DO probe 110 are not representative of the dissolved oxygen content of the sample 104. In some embodiments, the DO probe 110 may instead be a $CO_2$ probe or an optical pH probe.

Figure 1B:
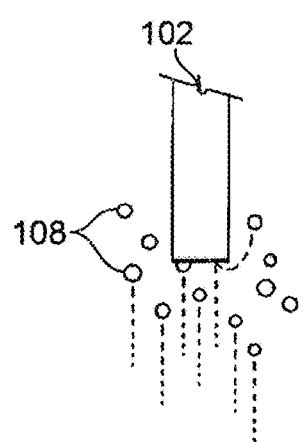
FIG. 1B depicts a close up view of a bottom sensing end of the DO probe as used in the bioreactor system with bubbles from sparging adhering to and deflecting off of the bottom sensing end of the DO probe, where the bottom sensing end is horizontally flat.

FIG. 1B depicts a close up view of a bottom sensing end of the DO probe as used in the bioreactor system with bubbles from the sparger 106 adhering to, impacting, and deflecting off of the bottom sensing end of the DO probe, where the bottom sensing end is horizontally flat. As shown in FIG. 1B, the bubbles 108 from the sparger 106 travel up through the solution 104. As the bubbles 108 impact the bottom sensing end of the DO probe 110, some of these bubbles adhere to the DO probe 110 while others impact and deflect, or bounce, off the DO probe 110. With either of these occurrences, unwanted measurement artifacts may be generated and communicated to the control system 114.

Figure 1C:
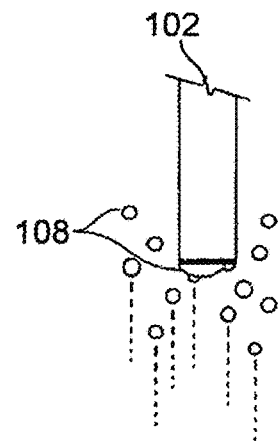
FIG. 1C depicts another close up view of the bottom sensing end of the DO probe as used in the bioreactor system with the bubbles from sparging accumulating on the bottom sensing end of the DO probe, where the bottom sensing end is horizontally flat.

FIG. 1C depicts another close up view of the bottom sensing end of the DO probe as used in the bioreactor system with the bubbles from the sparger 106 adhering and accumulating on the bottom sensing end of the DO probe, where the bottom sensing end is horizontally flat. As shown in FIG. 1C, the bubbles 108 from the sparger 106 travel up through the solution 104. As the bubbles 108 impact the bottom sensing end of the DO probe 110, some of these bubbles adhere to the DO probe 110. As more bubbles 108 adhere to the DO probe 110, these bubbles 108 may merge or combine to form a single, large bubble. In some embodiments, multiple bubbles 108 may adhere to the DO probe 110, and additional bubbles 108 may adhere to the bubbles 108 that are adhered to the DO probe 110. This accumulation of bubbles 108 may cause the DO probe to generate unwanted measurement artifacts for communication to the control system 114.

Figure 1D:
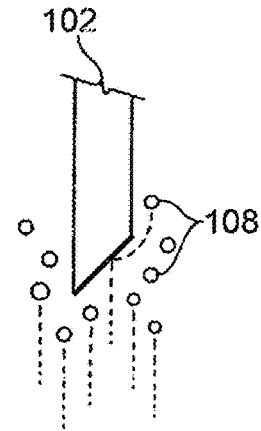
FIG. 1D depicts another close up view of a bottom sensing end of the DO probe as used in the bioreactor system with bubbles from sparging deflecting off of the bottom sensing end of the DO probe, where the bottom sensing end is angled.

FIG. 1D depicts another close up view of a bottom sensing end of the DO probe as used in the bioreactor system where the bottom sensing end is angled, with bubbles from the sparger 106 deflecting off of the bottom sensing end of the DO probe. As shown in FIG. 1D, the angled end of the DO probe 110 may reduce bubbles 108 accumulating or adhering to the DO probe 110. Thus, unwanted measurement artifacts may be reduced or not generated from adhering bubbles 108. However, as shown, the bubbles 108 may still impact the DO probe 110 as they deflect or bounce off the angled bottom end of the DO probe 108. These impacts may cause the DO probe to generate unwanted measurement artifacts which can be communicated to the control system 114.

Figure 2:
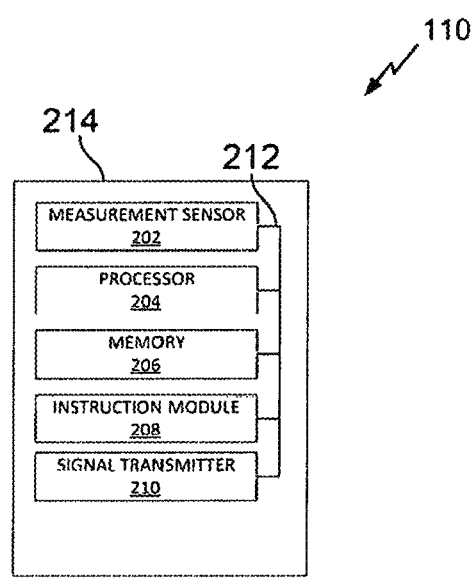
FIG. 2 depicts an example of a block diagram of the DO probe as described herein.

FIG. 2 depicts an example of a block diagram of the DO probe as described herein. The DO probe 110 may comprise a measurement sensor 202, a processor 204, a memory 206, an instruction module 208, and a signal transmitter 210. These components may all be electrically coupled via a bus 212.

The measurement sensor 202 may comprise a plurality of components not individually shown. For example, the measurement sensor 202 may comprise the components that enable the DO probe 110 to measure a dissolved oxygen content of a sample to which it is exposed. In some embodiments, the following components may not be considered part of the measurement sensor 202 but rather individual components of the DO probe 110.

In some embodiments, the measurement sensor 202 may be an optical sensor that includes a sensing surface comprising a luminescent (e.g., fluorescent) or similar dye (not shown). The measurement sensor 202 may further comprise a light source configured to generate and direct a light to the sensing surface to stimulate the fluorescent dye. In response to the light from the light source, the fluorescent dye may produce a light wave (e.g., may fluoresce) that is received and measured by one or more light detectors or sensors of the measurement sensor 202 as a measurement signal. Based on the oxygen content of the sample to which the measurement sensor 202 is exposed, an intensity or duration of the reflected light wave may vary, thus varying the measurement signal measured by the light detector of the measurement sensor 202. Alternatively, the measurements sensor may be an electrochemical sensor, comprising an oxygen permeable membrane covering an anode and a cathode in an electrolyte solution. Oxygen passes through the membrane and is reduced at the cathode, resulting in a signal that is proportional to the oxygen content of the sample.

Accordingly, the collection of one or more bubbles on the sensing surface of the measurement sensor 202 may be problematic, as it may cause a measurement artifact where the measurement of the sensor 202 is not representative of the amount of oxygen in the sample. For example, if sparged oxygen-containing bubbles (e.g., pure oxygen, or air) collect on the sensing surface of the sensor 202, (e.g., the fluorescent surface or oxygen permeable membrane) then the sensor measurement may be significantly higher than the actual oxygen concentration in the sample 104. Similarly, if the bubbles that collect on the measurement sensor 202 are not oxygen bubbles, or contain less oxygen than the sample, then the sensor measurement may be significantly lower than the actual oxygen content of the sample 104.

The DO probe 110 may include a processor 204 which controls operation of the DO probe 110. The processor 204 may also be referred to as a central processing unit (CPU). The memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. The memory 206 may store data or settings for use by the DO probe 110 or for communication to one or more external devices. The memory 206 may be configured to store measurements generated by the measurement sensor 202. For example, the memory 206 may store the oxygen content measurements as generated by the measurement sensor 202.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein. Accordingly, the processing system may include, e.g., hardware, firmware, and software, or any combination therein.

The instruction module 208 may be configured to store and/or apply any processor instructions for reducing measurement artifacts to the DO probe 110. In some embodiments, the processor instructions for reducing measurement artifacts may comprise software configured to compensate for bubbles that impact or accumulate on the sensing surface of the DO probe 110. In some embodiments, the processor instructions for reducing measurement artifacts may comprise various thresholds or settings to apply based on sensed or known conditions of DO probe 110. In some embodiments, the memory 206 may store the processor instructions for reducing measurement artifacts, and the instruction module 208 may apply the processor instructions. Alternatively, or additionally, the instruction module 208 or the memory 206 may store the processor instructions, and the processor instructions are applied by the external data or control system 114. These processor instructions for reducing measurement artifacts may be configured to filter out "spikes" or "drops" in the oxygen measurements that may be caused by the bubbles impacting or adhering to the sensing surface of the DO probe 110. In some embodiments, the instruction module 208 may comprise instructions to be performed by the processor 204. Details of an embodiment of the process are presented in relation to FIGS. 12 and 14 below.

The signal transmitter 210 may communicate the measurements generated by the measurement sensor 202 to another device external from the DO probe 110. The measurement(s) may be communicated via any type of communication link (e.g., wired, wireless, etc.). The output communicated by the signal transmitter 210 to the external device may be digital or analog. Alternatively, or additionally, the signal transmitter 210 may communicate any other outputs or signals from the external device to the measurement sensor.

The various components of the DO probe 110 may be coupled together by a bus system 212. The bus system 212 may include a data bus, for example, as well as a power bus, a control signal bus, and a status signal bus in addition to the data bus. Those of skill in the art will appreciate that the components of the DO probe 110 may be coupled together or accept or provide inputs to each other using some other mechanism. The DO probe 110 may also include a housing 214 that may include the signal transmitter 210 to allow transmission and reception of data between the DO probe 110 and the external device.

Although a number of separate components are illustrated in FIG. 2, one or more of the components may be combined or commonly implemented. Additionally, components not shown in FIG. 2 may be applicable to the operation of the DO probe 110. For example, though not shown, the DO probe 100 may include one or more of a D/A (digital/analog) converter or an A/D (analog/digital) converter. For example, the processor 204 may be used to implement not only the functionality described with respect to the processor 204, but also to implement the functionality described with respect to the instruction module 208 or the signal transmitter 210. Further, each of the components illustrated in FIG. 2 may be implemented using a plurality of separate components.

FIG. 3 depicts an example of a prior art optical DO probe. The sensing portion of the DO probe 300 is shown in a vertical cross-section. The sensing portion of the DO probe 300 comprises the light source and light detector circuit 302. FIG. 3 also includes an end portion 304 that couples to the sensing end of the DO probe 300. The end portion 304 comprises a transparent (e.g., glass) window 306 and a "patch" 308 of material with a coating comprising a fluorescent compound (e.g., a ruthenium containing or platinum containing compound) or mixture containing said compound. Other fluorescent materials include one or more of 1-pyrenebutryric acid, tris(4,7-diphenyl-1,10-phenanthroline) ruthenium(II) complex [Ru(dpp)3]2+, octaethylporphyrin (PtOEP and PdOEP), Platinum tetrakis(pentafuorophenyl)porphyrin (PtTFPP), tris(2-phenylpyridine) iridium (III) [Ir(ppy)3], or lead(II) complex of 8-hydroxy-5-quinolinesulfonic acid, and others known to those of skill in the art. In some embodiments, the fluorescent materials may be sourced from one or more of the following luminescent indicator groups: polycyclic aromatic hydrocarbons, polypyridyl complexes, metal porphyrins, cyclometallated complexes, and complexes with rarely used central atoms.

In some embodiments, the window 306 may be made of any other clear or transparent material through which light waves may travel with minimal distortion. On the exterior surface of the window 306 (e.g., the surface exposed to the sample) is the fluorescent patch 308 and, optionally, a protective oxygen permeable coating 310. The light source and light detector circuit 302 may be used to determine an amount of oxygen present in the sample as disclosed herein. As shown, the window 306 and the fluorescent patch 308 are positioned horizontal to the longitudinal axis of the DO probe 300, which is typically placed vertically in the sample. Therefore, bubbles which rise vertically through the sample can impact or adhere to the entire surface area of the window 306 and the fluorescent patch 308, (the sensing surface) which is exposed in the horizontal plane. In some embodiments, the buoyancy of the bubbles that do impact and adhere to the patch 308 may make the bubbles more difficult to dislodge from the horizontal surface. In some embodiments, the material of the fluorescent patch 308 may have a rough or porous surface, which increases the likelihood of the bubbles adhering to the fluorescent patch 308. In some embodiments, the outer surface of the fluorescent patch is protected by a gas permeable but light impenetrable coating to protect the fluorescent patch from the environment into which the probe is placed.

FIG. 4 depicts an embodiment of the present invention, a DO probe having a curved, solid material (or cover) 410 positioned between fluorescent patch 408 and the sample having its oxygen content measured. The sensing portion of the DO probe 400 (corresponding to the DO probe 110 of FIG. 1) is shown in a vertical cross-section. The sensing portion of the DO probe 400 comprises the light source and light detector circuit 402 and the end portion 404 as disclosed herein in relation to FIG. 3. Accordingly, the similar components will not be described again.

In addition to the components described herein in relation to FIG. 3, the end portion 404 of FIG. 4 includes a convex, solid material 410 coupled to the exposed surface of the fluorescent patch 408. The convex surface of the cover 410 may decrease the likelihood of bubbles adhering to the fluorescent patch 408, or reduces the amount of time any bubble remains in contact with the sensing surface of the probe by blocking the bubbles from reaching the fluorescent patch 408. In some embodiments, the buoyancy of the bubbles may cause the bubbles to travel along the convex surface of the cover 410 away from the fluorescent patch 408. Because the convex cover 410 is situated between the fluorescent patch 408 and the sample, at least a portion, and preferably all, of the convex cover 410 that is over the fluorescent patch 408 is made of a material which is sufficiently permeable to oxygen to permit the dissolved oxygen in the sample to reach the fluorescent patch 408 to permit measurement of the dissolved oxygen in the sample. In some embodiments, the convex cover 410 is made from Teflon, or polyethylene. In some embodiments, the convex cover 410 may be made of another material, such as dimethyl silicone rubber made by General Electric, which may be cured with various curing agents. In some embodiments, the entire DO probe may be coated in the dimethyl silicone rubber, or similar material. In another embodiment, not shown, the DO probe is an electrochemical sensor, rather than an optical sensor as depicted in FIG. 4. In such an embodiment, the convex cover is placed over the oxygen permeable membrane of the DO probe, reducing or preventing bubbles from impacting or adhering to the membrane of the DO probe. Because the convex cover 410 is situated between the oxygen permeable membrane and the sample, at least a portion, and preferably all, of the convex cover 410 that is over the oxygen permeable membrane is made of a material which is sufficiently permeable to oxygen (e.g., gas or liquid permeable) to permit the dissolved oxygen in the sample to reach the membrane to permit measurement of the dissolved oxygen in the sample.

In some embodiments (for either type of DO sensor), the curvature of the convex cover 410 can be increased, such that it resembles the shape shown in FIGS. 5A and 5B, or some amount of curvature greater or less than shown in FIGS. 5A and 5B. In some embodiments, the end portion 404 and accompanying cover 410 may couple to a DO probe 400 via a threaded connection, an adhesive coupling, friction coupling, or any other manner of coupling. In some embodiments, the end portion 404 and/or the cover 410 are removable. In some embodiments, the end portion 404 and/or cover 410 are permanently attached to the sensing end of the DO probe 400. In some embodiments, the cover 410 may form any shape as described herein in FIGS. 5A-10B. In some embodiments, the cover 410 may be formed as part of a stand-alone component comprising a cap or end portion that may be placed on the sensing end of any existing DO probe to reduce the measurement artifacts caused by the bubbles from sparging. For example, the stand-alone end portion can replace existing end portions 304 of DO probes 300, or the stand-alone cap can be placed on or over the existing end portions 304.

FIG. 5A depicts an example of a DO probe 500 (corresponding to the DO probe 110 of FIG. 1) having a domed exterior surface on which the sensing surface may be mounted such that the sensing surface itself is curved but still directly exposed to the sample. The sensing portion of the DO probe 500 is shown in a vertical cross-section. In some embodiments, the exterior surface of the DO probe 500 may be domed only in the plane of the cross-section (e.g., may not be domed in the axis going into/coming out from the page). In some embodiments, the exterior surface of the DO probe 500 may be domed in all planes. The sensing portion of the DO probe 500 comprises the light source and light detector circuit 502 and an end portion 504 as disclosed herein in relation to FIG. 3. Accordingly, the similar components will not be described again.

In some embodiments, the dome 506 may be formed from glass, plastic, or other polymer which is sufficiently transparent material. In some embodiments the interior of the dome 506 is solid, consisting of the same or a different material as the dome 506 and the light source and light detector circuit 502 may be housed within the end portion 504. The dome 506 may include one or more light guides, mirrors, etc., to ensure light and reflections to and from the light source and light detection circuit 502 are conveyed to the patch 508 effectively and efficiently with minimal loss or interference. In some embodiments, the dome 506 may be formed from molded dimethyl silicone rubber, a solid piece of glass, or translucent or transparent plastic. The fluorescent patch 508 may be mounted (e.g., press-fit) to the outer (e.g., exterior) surface of the dome 506, such that a majority of the surface of the dome 506 is covered by the fluorescent patch 508. The dome 506 may increase a surface area of the fluorescent patch 508 (as compared to the surface area of the fluorescent patch 308 of FIG. 3. In some embodiments, the fluorescent patch 508 may not cover a majority of the surface of the dome 506. In a preferred embodiment, the domed shape reduces the likelihood of bubbles adhering to the fluorescent patch 508, or reduces the amount of time the bubble is in contact with the fluorescent patch 508, as the buoyancy of the bubbles face less resistance caused by the fluorescent patch 508 and are thus more likely to continue moving past the fluorescent patch 508 and not adhere to it. In some embodiments, the curvature of the dome 506 may be varied from the shape depicted in FIG. 5A, for example to more closely resemble the shape of the convex cover shown in FIG. 4, or to have any other desired curvature to deflect bubbles from the sensing surface of the DO probe 500.

In some embodiments, the end portion 504 and accompanying dome 506 may couple to a DO probe 500 via a threaded connection, an adhesive coupling, a friction coupling, or any other manner of coupling. In some embodiments, one or more of the end portion 504 and dome 506 are removable. In some embodiments, the end portion 504 and dome 506 are permanently attached to the sensing end of the DO probe 500. In some embodiments, the dome 506 may be formed as part of a stand-alone component comprising a cap, cover, or end portion that may be placed on the sensing end of any existing DO probe to reduce the measurement artifacts caused by the bubbles from sparging. For example, the stand-alone cover of the domed shape 506 may be added to an existing DO probe, e.g., DO probe 400. Alternatively, or additionally, the stand-alone cap or end portion can replace existing end portions 304 of DO probes 300, or be configured to fit over existing end portions 304.

FIG. 5B depicts an example of a three-dimensional perspective view of the domed exterior surface of the DO probe 500 of FIG. 5A. The dome 506 may be three-dimensionally domed. As shown, the fluorescent patch (not shown in this figure) may cover the majority of the exterior of the dome 506 and may optionally be covered by a protective coating 510, e.g. dimethyl silicone rubber. The base 512 of the dome 506 may mount directly to the DO probe 500, for example when the dome 506 forms a cap or end portion that may be placed on the sensing end of any DO probe 500 to reduce the measurement artifacts caused by the bubbles from sparging.

Figure 6A:
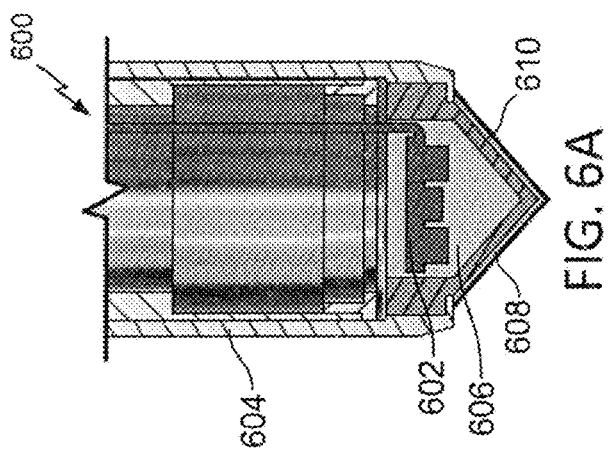
FIG. 6A depicts an example of a DO probe having a tapered exterior surface on which the sensing surface may be mounted such that the sensing surface forms a tapered edge and is directly exposed to the sample.

FIG. 6A depicts an example of a DO probe having a tapered exterior surface on which the sensing surface may be mounted such that the sensing surface forms the tapered edge and is directly exposed to the sample. The sensing portion of the DO probe 600 (corresponding to the DO probe 110 of FIG. 1) is shown in a vertical cross-section. In some embodiments, the exterior surface of the DO probe 600 may be tapered only in the plane of the cross-section (e.g., may not be tapered in the axis going into/coming out from the page). In some embodiments, the exterior surface of the DO probe 600 may be tapered in all three dimensions (e.g., conical). The sensing portion of the DO probe 600 comprises the light source and light detector circuit 602 and an end portion 604 as disclosed herein in relation to FIG. 3. Accordingly, the similar components will not be described again.

In some embodiments, the tapered structure 606 may be formed from glass, a plastic or other polymer which is sufficiently transparent material. In some embodiments the interior of the tapered structure 606 is solid, consisting of the same or a different material as the tapered structure 606 and the light source and light detector circuit 602 may be housed within the end portion 604. The tapered structure 606 may include one or more light guides, mirrors, etc., to ensure light and reflections to and from the light source and light detection circuit 602 are conveyed to the patch 608 effectively and efficiently with minimal loss or interference. In some embodiments, the tapered structure 606 may be formed from molded dimethyl silicone rubber, a solid piece of glass, or translucent or transparent plastic. The fluorescent patch 608 may be mounted (e.g., press-fit) to the outer (e.g., exterior) surface of the tapered structure 606, such that a majority of the surface of the tapered structure 606 is covered by the fluorescent patch 608. The tapered structure 606 may increase a surface area of the fluorescent patch 608 (as compared to the surface area of the fluorescent patch 308 of FIG. 3). In some embodiments, the fluorescent patch 608 may not cover a majority of the surface of the tapered structure 606. In a preferred embodiment, the tapered shape reduces the likelihood of bubbles adhering to the fluorescent patch 608, or reduces the amount of time the bubble is in contact with the fluorescent patch 608, as the buoyancy of the bubbles face less resistance caused by the fluorescent patch 608 and are thus more likely to continue moving past the fluorescent patch 608 and not adhere to it. In some embodiments, the angle of the tapered structure 606 may be varied (e.g., increased or decreased) from that shown in FIG. 6A.

In some embodiments, the end portion 604 and accompanying tapered structure 606 may couple to a DO probe 600 via a threaded connection, an adhesive coupling, a friction coupling, or any other manner of coupling. In some embodiments, one or more of the end portion 604 and the tapered structure 606 are removable. In some embodiments, the end portion 604 and the tapered structure 606 are permanently attached to the sensing end of the DO probe 600. In some embodiments, the tapered structure 606 may be formed as part of a stand-alone component comprising a cap, cover, or end portion that may be placed on the sensing end of any existing DO probe to reduce the measurement artifacts caused by the bubbles from sparging. For example, the stand-alone cover of the tapered structure 606 may be added to an existing DO probe, e.g., DO probe 400. Alternatively, or additionally, the stand-alone cap or end portion can replace existing end portions 304 of DO probes 300, or be configured to fit over existing end portions 304.

Figure 6B:
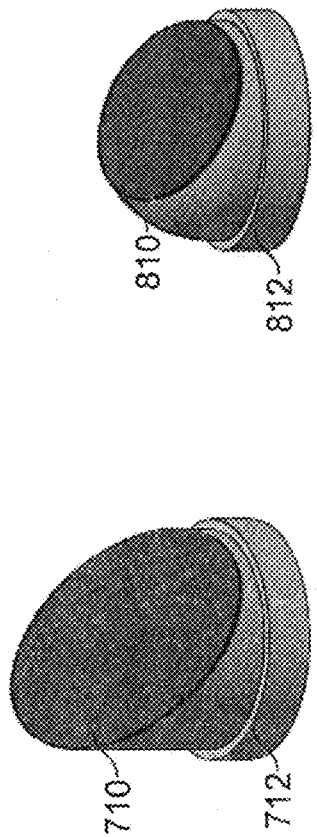
FIG. 6B depicts an example of a three-dimensional perspective view of a cone forming the tapered exterior surface of the DO probe of FIG. 6A.

FIG. 6B depicts an example of a three-dimensional perspective view of a cone forming the exterior surface of the DO probe 600 of FIG. 6A. As shown, fluorescent patch (not shown in this figure) may cover the majority of the exterior of the tapered structure 606 and may optionally be covered by a protective coating 610, e.g., dimethyl silicone rubber. The base 612 of the tapered structure 606 may mount directly to the DO probe 600, for example when the tapered structure 606 forms a cap or end portion that may be placed on the sensing end of any DO probe 600 to reduce the measurement artifacts caused by the bubbles from sparging.

Figure 7A:
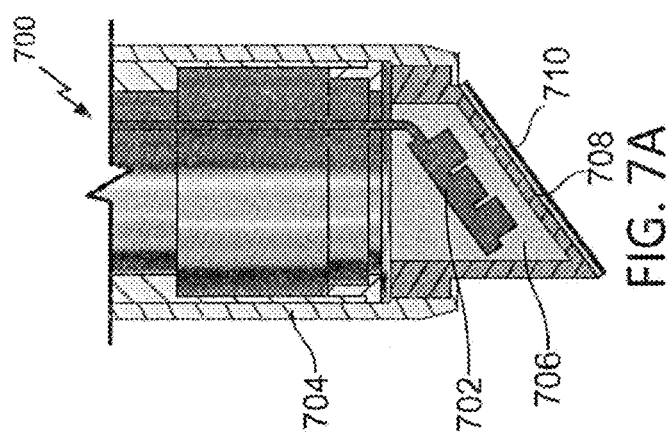
FIG. 7A depicts an example of a DO probe having an angled exterior surface on which the sensing surface is disposed such that the sensing surface forms the slanted surface and is directly exposed to the sample.

FIG. 7A depicts an example of a DO probe having an angled exterior surface on which the sensing surface is disposed such that the sensing surface forms a slanted surface that is exposed to the sample. The sensing portion of the DO probe 700 (corresponding to the DO probe 110 of FIG. 1) is shown in a vertical cross-section. The sensing portion of the DO probe 700 comprises the light source and light detector circuit 702 and the end portion 704 as disclosed herein in relation to FIG. 3. Accordingly, the similar components will not be described again.

In some embodiments, the angled structure 706 may be formed from glass, a plastic or other polymer which is sufficiently transparent material. In some embodiments the interior of the angled structure 706 is solid, consisting of the same or a different material as the angled structure 706 and the light source and light detector circuit 702 may be housed within the end portion 704. The dome 706 may include one or more light guides, mirrors, etc., to ensure light and reflections to and from the light source and light detection circuit 702 are conveyed to the patch 708 effectively and efficiently with minimal loss or interference. In some embodiments, the angled structure 706 may be formed from molded dimethyl silicone rubber, a solid piece of glass, or translucent or transparent plastic. The fluorescent patch 708 may be mounted (e.g., press-fit) to the outer (e.g., exterior) surface of the angled structure 706, such that a majority of the surface of the angled structure 706 is covered by the fluorescent patch 708. The angled structure 706 increases a surface area of the fluorescent patch 708 (as compared to the surface area of the fluorescent patch 308 of FIG. 3). In some embodiments, the fluorescent patch 708 may not cover a majority of the surface of the angled structure 706. In a preferred embodiment, the angled shape reduces the likelihood of bubbles adhering to the fluorescent patch 708, or reduces the amount of time the bubble is in contact with the fluorescent patch 708, as the buoyancy of the bubbles face less resistance caused by the fluorescent patch 708 and are thus more likely to continue moving past the fluorescent patch 708 and not adhere to it. In some embodiments, the angle of the angled structure 706 may be varied (e.g., increased or decreased) from that shown in FIG. 7A.

In some embodiments, the end portion 704 and accompanying angled structure 706 may couple to a DO probe 700 via a threaded connection, an adhesive coupling, a friction coupling, or any other manner of coupling. In some embodiments, one or more of the end portion 704 and angled structure 706 are removable. In some embodiments, the end portion 704 and angled structure 706 are permanently attached to the sensing end of the DO probe 700. In some embodiments, the angled structure 706 may be formed as part of a stand-alone component comprising a cap, cover, or end portion that may be placed on the sensing end of any existing DO probe to reduce the measurement artifacts caused by the bubbles from sparging. For example, the stand-alone cover of the angled structure 706 may be added to an existing DO probe, e.g., DO probe 400. Alternatively, or additionally, the stand-alone cap or end portion can replace existing end portions 304 of DO probes 300, or be configured to fit over existing end portions 304.

Figure 7B:
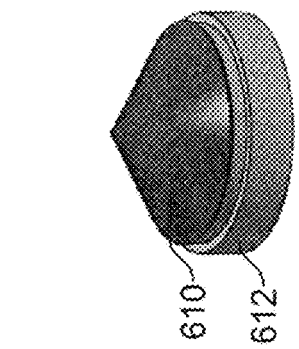
FIG. 7B depicts an example of a three-dimensional perspective view of the angled exterior surface of the DO probe of FIG. 7A.

FIG. 7B depicts an example of a three-dimensional perspective view of the angled exterior surface of the DO probe 700 of FIG. 7A. As shown, the fluorescent patch (not shown in this figure) may cover the majority of the exterior of the angled structure 706 and may optionally be covered by a protective coating 710, e.g., dimethyl silicone rubber. The cylindrical base 712 of the angled structure 706 may mount directly to the DO probe 700, for example when the angled structure 706 forms a cap or end portion that may be placed on the sensing end of any DO probe 700 to reduce the measurement artifacts caused by the bubbles from sparging.

Figure 8A:
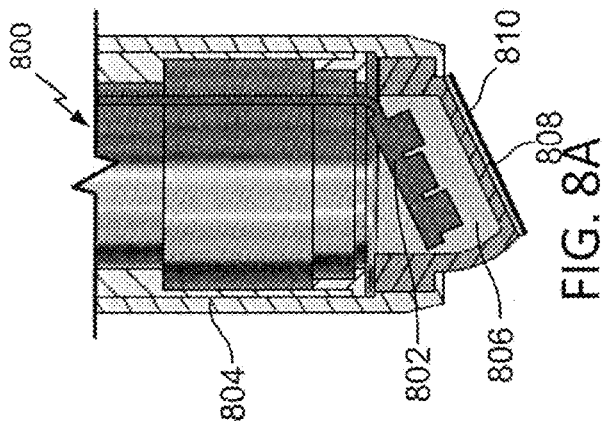
FIG. 8A depicts an example of a DO probe having a slanted and rounded exterior surface on which the sensing surface is disposed such that the sensing surface forms the slanted surface and is directly exposed to the sample.

FIG. 8A depicts an example of a DO probe having an angled exterior surface with a rounded base portion, the sensing surface disposed on the angled exterior surface such that the sensing surface forms an angled edge and is directly exposed to the sample. The sensing portion of the DO probe 800 is shown in a vertical cross-section. In some embodiments, the exterior surface of the DO probe 800 may be angled only in the plane of the cross-section. The sensing portion of the DO probe 800 comprises the light source and light detector circuit 802 and the end portion 804 as disclosed herein in relation to FIG. 3. Accordingly, the similar components will not be described again.

In some embodiments, the rounded and angled structure 806 may be formed from glass, a plastic or other polymer which is sufficiently transparent material. In some embodiments the interior of the angled structure 806 is solid, consisting of the same or a different material as the angled structure 806 and the light source and light detector circuit 802 may be housed within the end portion 804. The dome 806 may include one or more light guides, mirrors, etc., to ensure light and reflections to and from the light source and light detection circuit 802 are conveyed to the patch 808 effectively and efficiently with minimal loss or interference. In some embodiments, the rounded and angled structure 806 may be formed from molded dimethyl silicone rubber, a solid piece of glass, or translucent or transparent plastic. The fluorescent patch 808 may be mounted (e.g., press-fit) to an outer (e.g., exterior) surface of the rounded and angled structure 806, such that a majority of the surface of the rounded and angled structure 806 is covered by the fluorescent patch 808. In some embodiments, the fluorescent patch 808 may not cover a majority of the surface of the rounded and angled structure 806. In a preferred embodiment, the rounded and angled shape reduces the likelihood of bubbles adhering to the fluorescent patch 808, or reduces the amount of time the bubble is in contact with the fluorescent patch 808, as the buoyancy of the bubbles face less resistance caused by the fluorescent patch 808 and are thus more likely to continue moving past the fluorescent patch 808 and not adhere to it. In some embodiments, the angle of the rounded and angled structure 806 may be varied (e.g., increased or decreased) from that shown in FIG. 8A.

In some embodiments, the end portion 804 and accompanying rounded and angled structure 806 may couple to a DO probe 800 via a threaded connection, an adhesive coupling, a friction coupling, or any other manner of coupling. In some embodiments, one or more of the end portion 804 and rounded and angled structure 806 are removable. In some embodiments, the end portion 804 and rounded and angled structure 806 are permanently attached to the sensing end of the DO probe 800. In some embodiments, the rounded and angled structure 806 may be formed as part of a stand-alone component comprising a cap, cover, or end portion that may be placed on the sensing end of any existing DO probe to reduce the measurement artifacts caused by the bubbles from sparging. For example, the stand-alone cover of the angled structure 806 may be added to an existing DO probe, e.g., DO probe 400. Alternatively, or additionally, the stand-alone cap or end portion can replace existing end portions 304 of DO probes 300, or be configured to fit over existing end portions 304.

Figure 8B:
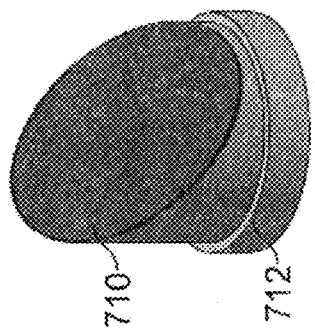
FIG. 8B depicts an example of a three-dimensional perspective view of the slanted and rounded exterior surface of the DO probe of FIG. 8A.

FIG. 8B depicts an example of a three-dimensional perspective view of the rounded and angled structure of the DO probe 800 of FIG. 8A. As shown, the fluorescent patch (not shown in this figure) may cover the majority of the exterior of the angled face of the rounded and angled structure 806, which may optionally be covered by a protective coating 810, e.g., dimethyl silicone. The rounded base 812 of the rounded and angled structure 806 may mount directly to the DO probe 800, for example when the rounded and angled structure 806 forms a cap or end portion that may be placed on the sensing end of any DO probe 800 to reduce the measurement artifacts caused by the bubbles from sparging.

Figure 9A:
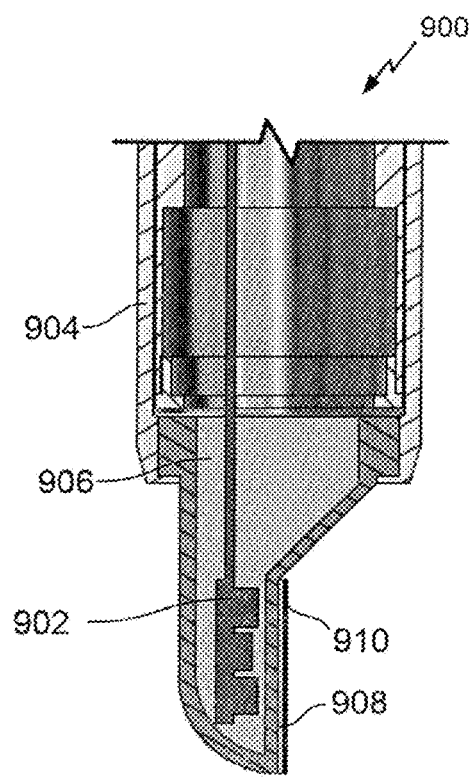
FIG. 9A depicts an example of a DO probe having a vertical exterior surface on which the sensing surface is disposed such that the sensing surface is directly exposed to the sample in a vertical direction.

FIG. 9A depicts an example of a DO probe having a vertical exterior surface on which the sensing surface is disposed such that the sensing surface is exposed to the sample in a vertical orientation. The sensing portion of the DO probe 900 (corresponding to the DO probe 110 of FIG. 1) is shown in a vertical cross-section. The sensing portion of the DO probe 900 comprises the light source and light detector circuit 902 and the end portion 904 as disclosed herein in relation to FIG. 3. Accordingly, the similar components will not be described again.

In some embodiments, the vertical structure 906 may be formed from glass, a plastic or other polymer which is sufficiently transparent material. In some embodiments the interior of the vertical structure 906 is solid, consisting of the same or a different material as the vertical structure 906 and the light source and light detector circuit 902 may be housed within the end portion 904. The vertical structure 906 may include one or more light guides, mirrors, etc., to ensure light and reflections to and from the light source and light detection circuit 902 are conveyed to/from the patch 908 effectively and efficiently with minimal loss or interference. In some embodiments, the vertical structure 906 may be formed from molded dimethyl silicone rubber, a solid piece of glass, or translucent or transparent plastic. The fluorescent patch 908 maybe mounted (e.g., press-fit) to the outer (e.g., exterior) surface of the vertical structure 906, such that a majority of the surface of the vertical structure 906 is covered by the fluorescent patch 908. In some embodiments, the fluorescent patch 908 may not cover a majority of the surface of the vertical structure 906. In a preferred embodiment, the vertical shape reduces the likelihood of bubbles adhering to the fluorescent patch 908, or reduces the amount of time the bubble is in contact with the fluorescent patch 908, as the buoyancy of the bubbles face less resistance caused by the fluorescent patch 908 and are thus more likely to continue moving past the fluorescent patch 908 and not adhere to it.

In some embodiments, the end portion 904 and accompanying vertical structure 906 may couple to a DO probe 900 via a threaded connection, an adhesive coupling, a friction coupling, or any other manner of coupling. In some embodiments, one or more of the end portion 904 and vertical structure 906 are removable. In some embodiments, the end portion 904 and vertical structure 906 are permanently attached to the sensing end of the DO probe 900. In some embodiments, the vertical structure 906 may be formed as part of a stand-alone component comprising a cap, cover, or end portion that may be placed on the sensing end of any existing DO probe to reduce the measurement artifacts caused by the bubbles from sparging. For example, the stand-alone cover of the vertical structure 906 may be added to an existing DO probe, e.g., DO probe 400. Alternatively, or additionally, the stand-alone cap or end portion can replace existing end portions 304 of DO probes 300, or be configured to fit over existing end portions 304.

Figure 9B:
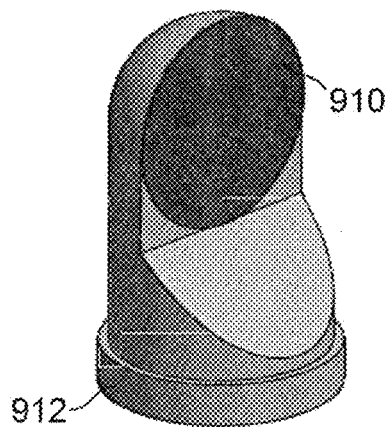
FIG. 9B depicts an example of a three-dimensional perspective view of the vertical exterior surface of the DO probe of FIG. 9A.

FIG. 9B depicts an example of a three-dimensional perspective view of the vertical exterior surface of the DO probe 900 of FIG. 9A. As shown, the fluorescent patch (not shown in this figure) may cover the majority of the exterior of the vertical face of the vertical structure 906, which may optionally be covered by a protective coating 910, e.g., dimethyl silicone rubber. The cylindrical base 912 of the vertical structure 906 may mount directly to the DO probe 900, for example when the vertical structure 906 forms a cap or end portion that may be placed on the sensing end of any DO probe 900 to reduce the measurement artifacts caused by the bubbles from sparging.

Figure 10A:
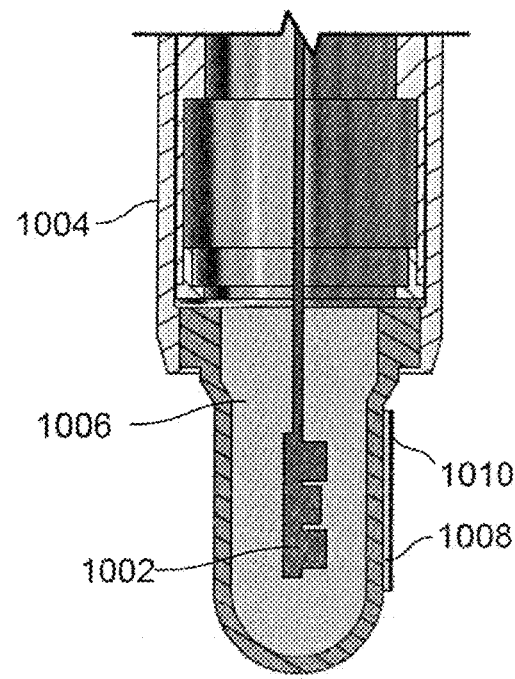
FIG. 10A depicts an example of a DO probe having a vertical, curved exterior surface on which the sensing surface is disposed such that the sensing surface is directly exposed to the sample in a vertical direction.

FIG. 10A depicts an example of a DO probe having a vertical, curved exterior surface on which the sensing surface is disposed such that the sensing surface is exposed to the sample in a vertical direction. The sensing portion of the DO probe 1000 (corresponding to the DO probe 110 of FIG. 1) is shown in a vertical cross-section. The sensing portion of the DO probe 1000 comprises the light source and light detector circuit 1002 and the end portion 1004 as disclosed herein in relation to FIG. 3. Accordingly, the similar components will not be described again.

In some embodiments, the vertical, curved structure 1006 may be formed from glass, a plastic or other polymer which is sufficiently transparent material. In some embodiments the interior of the vertical, curved structure 1006 is solid, consisting of the same or a different material as the vertical, curved structure 1006 and the light source and light detector circuit 1002 may be housed within the end portion 1004. The vertical, curved structure 1006 may include one or more light guides, mirrors, etc., to ensure light and reflections to and from the light source and light detection circuit 1002 are conveyed to the patch 1008 effectively and efficiently with minimal loss or interference. In some embodiments, the vertical, curved structure 1006 is gas permeable. In some embodiments, the vertical, curved structure 1006 may be formed from molded dimethyl silicone rubber, a solid piece of glass, or translucent or transparent plastic. The fluorescent patch 1008 may be mounted (e.g., press-fit) to the outer (e.g., exterior) surface of the vertical, curved structure 1006, such that a majority of the surface of the vertical curved structure 1006 is covered by the fluorescent patch 1008. In some embodiments, the fluorescent patch 1008 may not cover a majority of the surface of the vertical, curved structure 1006. In a preferred embodiment, the vertical shape reduces the likelihood of bubbles adhering to the fluorescent patch 1008, or reduces the amount of time the bubble is in contact with the fluorescent patch 1008, as the buoyancy of the bubbles face less resistance caused by the fluorescent patch 1008 and are thus more likely to continue moving past the fluorescent patch 1008 and not adhere to it.

In some embodiment the end portion 1004 and accompanying vertical, curved structure 1006 may couple to a DO probe 1000 via a threaded connection, an adhesive coupling, a friction coupling, or any other manner of coupling. In some embodiments, one or more of the end portion 1004 and vertical, curved structure 1006 are removable. In some embodiments, the end portion 1004 and vertical, curved structure 1006 are permanently attached to the sensing end of the DO probe 1000. In some embodiments, the vertical, curved structure 1006 may be formed as part of a stand-alone component comprising a cap, cover, or end portion that may be placed on the sensing end of any existing DO probe to reduce the measurement artifacts caused by the bubbles from sparging. For example, the stand-alone cover of the vertical, curved structure 1006 may be added to an existing DO probe, e.g., DO probe 400. Alternatively, or additionally, the stand-alone cap or end portion can replace existing end portions 304 of DO probes 300, or be configured to fit over existing end portions 304.

Figure 10B:
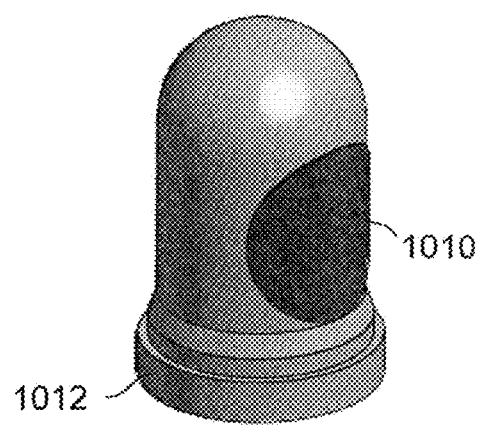
FIG. 10B depicts an example of a three-dimensional perspective view of the vertical, curved exterior surface of the DO probe of FIG. 9A.

FIG. 10B depicts an example of a three-dimensional perspective view of the vertical exterior surface of the DO probe 1000 of FIG. 10A. The fluorescent patch (not shown in this figure) may cover the majority of the exterior of the vertical, curved face of the vertical, curved structure 1006, which may optionally be covered by a protective coating 1010, e.g., dimethyl silicone rubber. The cylindrical base 1012 of the vertical, curved structure 1006 may mount directly to the DO probe 1000, for example when the vertical, curved structure 1006 forms a cap or end portion that may be placed on the sensing end of any DO probe 1000 to reduce the measurement artifacts caused by the bubbles from sparging.

Figure 11B:
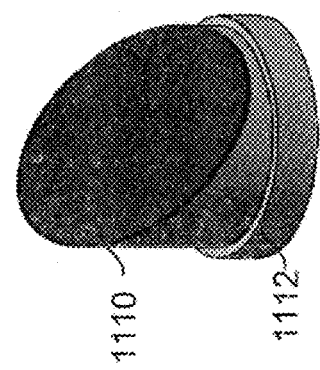
FIG. 11B depicts an example of a three-dimensional perspective view of the angled exterior surface of the DO probe of FIG. 11A.
Figure 11A:
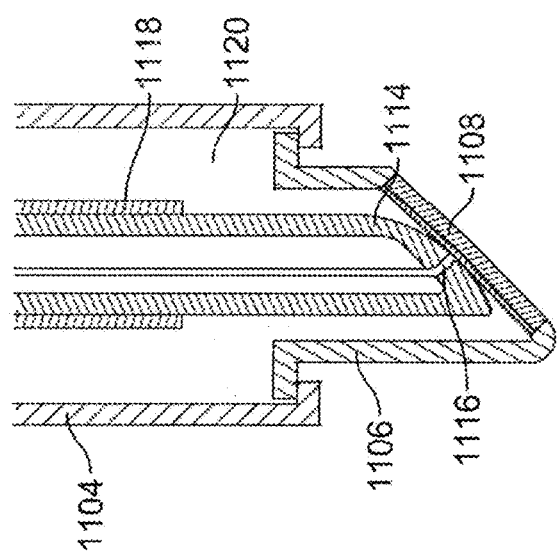
FIG. 11A depicts an example of an electrochemical DO probe having an angled exterior surface on which a sensing surface is disposed such that the sensing surface forms a slanted surface that is exposed to the sample.

FIG. 11A depicts an example of an electrochemical DO probe 1100 having an angled exterior surface on which the oxygen permeable membrane is disposed such that the membrane forms a slanted surface that is exposed to the sample. The sensing portion of the DO probe 1100 (corresponding to the DO probe 110 of FIG. 1) is shown in a vertical cross-section. The sensing portion of the DO probe 1100 as shown comprises a portion of a sensor body 1104 and an angled structure 1106. Within the sensor body portion 1104 and the angled structure 1106 are located an oxygen permeable layer 1108, a cathode support 1114, a cathode 1116, an anode 1118, and an electrolyte chamber 1120.

In the polarographic DO probe 1100, oxygen molecules dissolved in the sample pass through the oxygen permeable layer 1108. The oxygen molecules are then reduced by the cathode 1116. This reduction produces an electrical current that travels to the anode 1118 and is interpreted by the DO probe 1100 electronics (not shown) to determine a measurement of an oxygen content of the sample. In some embodiments, the cathode may be platinum while the anode is silver or other materials known to those of skill in the art.

In FIG. 11A, the angled structure 1106 may be formed from glass, a plastic, or some other polymer which is sufficiently transparent or capable of housing the components of the DO probe 1100. In some embodiments, the angled structure 706 may be formed from molded dimethyl silicone rubber, a solid piece of glass, or plastic. The oxygen permeable layer 1108 (e.g., made from a layered composite including Teflon and silicone-rubber) may be mounted or formed such that it forms an angled surface between two portions of the angled structure 1106. This angled structure, as disclosed herein in relation to FIGS. 7A and 7B, may reduce the number of sparged oxygen bubbles that adhere to the oxygen permeable membrane 1108 or reduces the amount of time the bubble is in contact with the oxygen permeable membrane 1108, thus reducing the measurement artifacts caused by the bubbles. In some embodiments, the angle of the angled structure 1108 may be varied (e.g., increased or decreased) from that shown in FIG. 11A.

In some embodiments the end portion 1104 and accompanying angled structure 1106 may couple to the DO probe 1100 via a threaded connection, an adhesive coupling, friction coupling, or any other manner of coupling. In some embodiments, the end portion 1104 and angled structure 1106 are removable. In some embodiments, the end portion 1104 and angled structure 1106 are permanently attached to the sensing end of the DO probe 1100. In some embodiments, the angled structure 1106 with the oxygen permeable membrane 1108 may be formed as part of a stand-alone component comprising a cap or end portion that may be placed on the sensing end of any existing electrochemical DO probe to reduce the measurement artifacts caused by the bubbles from sparging.

FIG. 11B depicts an example of a three-dimensional perspective view of the angled exterior surface of the DO probe 1100 of FIG. 11A. The oxygen permeable layer 1108 (not shown in this figure) may cover the majority of the exterior of the angled structure 1106 and may optionally be covered by a protective coating 1110, e.g., dimethyl silicone rubber. The cylindrical base 1112 of the angled structure 1106 may mount directly to the DO probe 1100, for example when the angled structure 1106 forms a cap or end portion that may be placed on the sensing end of any DO probe 1100 to reduce the measurement artifacts caused by the bubbles from sparging.

As disclosed herein, the exterior shapes of FIGS. 4-10B are not gas or liquid permeable. Accordingly, the fluorescent patch is positioned on the outside of these shapes such that light and reflectance is directed to and from the light source and light detector circuits of the associated sensors. Accordingly, as shown from the placements of the light source and light detector circuits within the end portions shown in FIGS. 5A-10B, any of these exterior surfaces described herein may be formed separately from the DO probes. In some aspects, the light source and light detector components may be located within the exterior shapes, for example in the space indicated by the polymer and material portions 406, 506, 606, 706, 806, 906, and 1006, as disclosed herein. The use of optical DO probes described throughout is merely for example discussion. The same structures and coatings may apply to electrochemical DO probes, as discussed in relation to FIG. 11. For example, in the embodiments of FIGS. 4-10B described herein, the optical DO probes could be replaced with electrochemical DO probes. Accordingly, the oxygen permeable membrane 1108 of FIG. 11A may replace the fluorescent patches of FIGS. 4-10B in similar orientations on similar 3D-shaped structures (e.g., angled structure 1106, etc.). Alternatively, or additionally, the fluorescent patches, the protective coatings, and the light source and light detector circuits described in relation to the optical DO probes of FIGS. 4-10B herein may be replaced by the oxygen permeable membrane and the cathode/anode components of an electrochemical DO probe. The oxygen permeable membrane may be located on the depicted 3D structures in the same location as the fluorescent patch and protective coating. In some embodiments, any of the embodiments described herein as applying to the DO probe may apply to any $CO_2$ probe or pH optical sensor. Accordingly, corresponding components of the $CO_2$ probe and pH optical probe may be replaced to facilitate similar operations as described herein in relation to FIGS. 5A-11B. In some embodiments, the DO probes disclosed herein have modified sensing surfaces that deflect bubbles and prevent them from adhering to the sensing surface. In some embodiments, the DO probes disclosed herein comprise processor instructions for reducing measurement artifacts and/or circuitry enabling the DO probe to include filtering of spikes or drops or other measurement artifacts caused by bubbles. In a preferred embodiment, one of the physical embodiments disclosed herein having a modified sensing surface is combined with the processor instructions or filtering functionality described herein. The measurement signal that is produced by the DO probe as described herein are preferably substantially free of the effects of bubbles that plague bioprocess applications that utilize sparge aeration. Bioreactor operators using the DO probes as described herein may employ much simpler control systems to manage the bioreactor as a result of the improved DO probes described herein. Bioreactor aeration control using the described DO probes may be improved on all classes of control equipment, resulting in more precise control of bioreactor DO concentration, greater bioprocess yields, and better quality of the desired biological.

Figure 12:
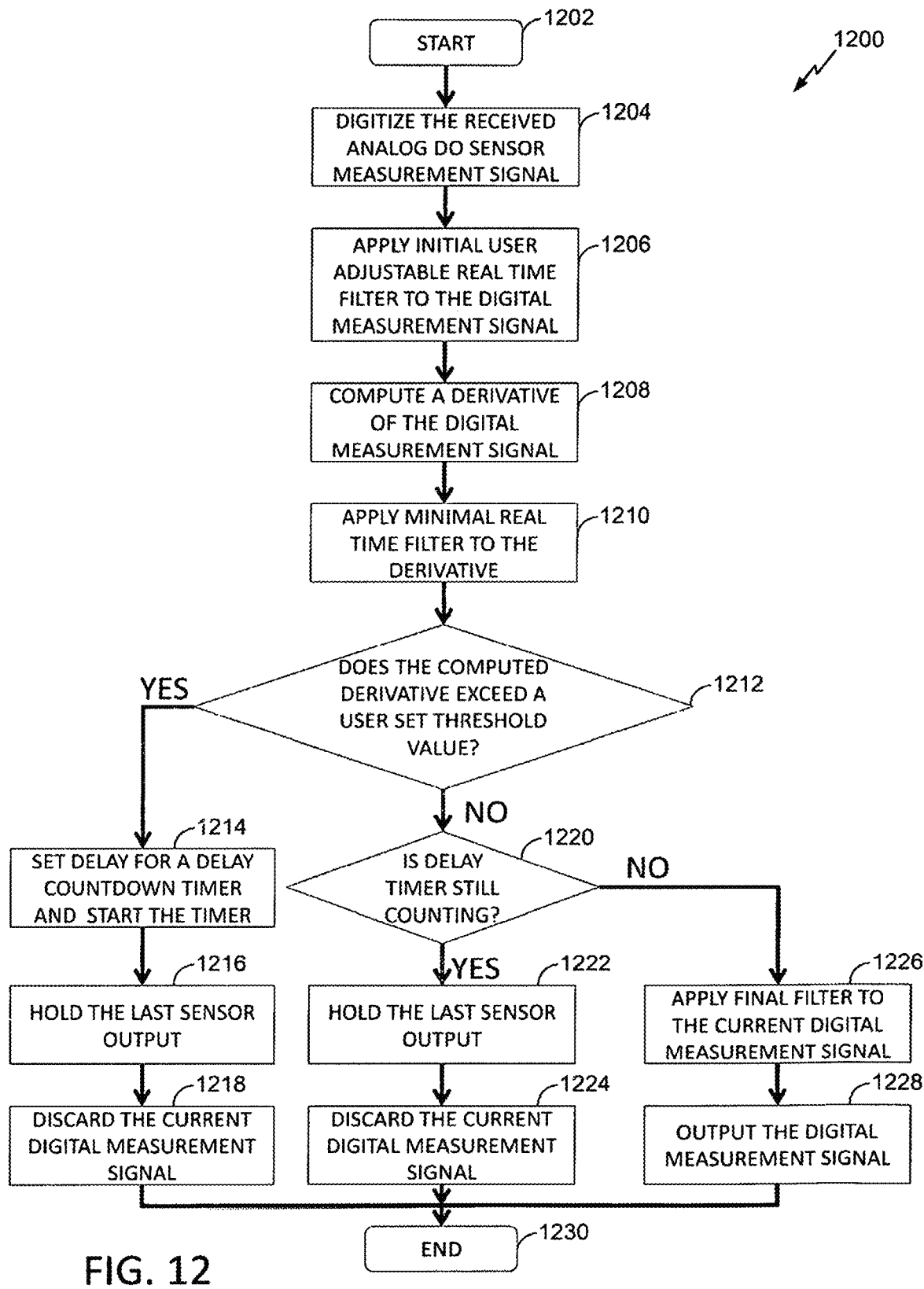
FIG. 12 depicts an example of a flowchart of a process that may be implemented to reduce measurement artifacts caused by bubbles that impact or adhere to the sensing surface of the DO probe.

FIG. 12 depicts a flowchart of a process 1200 that may be implemented to reduce measurement artifacts caused by bubbles that impact or adhere to the sensing surface of the DO probe. In some embodiments, the process 1200 depicted in FIG. 12 may be implemented by one or more of the components disclosed herein in relation to FIG. 2. For example, the process 1200 may be configured to be stored in the memory 206 or the instruction module 208 and may be configured to be implemented by one or more of the processor 204 or the instruction module 208. In some embodiments, the process 1200 may be stored in another component not shown in FIG. 2 and may be implemented by a component not shown in FIG. 2. The process 1200 may be performed for each DO measurement signal value received from the DO sensor of the DO probe.

The process 1200 begins at block 1202 and proceeds to block 1204. At block 1204, the process receives a DO measurement signal, either in an analog format with values that are then digitized or with values in a native digital format. In some embodiment, an analog-digital, converter (ADC) may be used to convert the analog format to the digital format. In some embodiments, the block 1202 may generate one or more digitized DO measurement signal values at regular intervals (e.g., once per second, one per five seconds, etc.). Once the DO measurement signal is in a digital format, the process 1200 proceeds to block 1206.

At block 1206, the process 1200 applies a first real time filter to the digital measurement signal. The filter may filter values from the digital measurement signal to eliminate noise and smooth the digitized sensor signal. For example, a low-pass filter may be used to reduce high frequency noise (e.g., digital measurement values that exceed the filter level, etc.). The filter applied may be any other known filter configured to remove noise and smooth input data. In some embodiments, the degree or type of filtering may be user-adjustable. The output generated by this block 1206 is a smoothed digital signal with reduced high-frequency noise. Once the filter is applied to the digitized DO measurement signal, the process 1200 proceeds to block 1208.

At block 1208, the process 1200 computes a derivative signal of the digitized DO measurement signal. The derivative may comprise a ratio comparing the amount of measurement change over a given period of time. Thus, the derivative may comprise a measure of the rate of change of the DO measurement signal. For example, the derivative may be computed using Equation 1 below:

$$DD=(x_1-x_2)/(t_1-t_2),\quad\text{Equation 1}$$

Where:
DD=digital derivative;
$x_1$=digital measurement value at $t_1$;
$x_2$=digital measurement value at $t_2$;
$t_1$=time 1; and
$t_2$=time 2.

Thus, the derivative provides a measurement of how much the digital measurement signal changes over a period of time defined by $t_1$-$t_2$. In some embodiments, the process 1200 is executed for each measurement signal received from the DO sensor. The derivative may be calculated where $x_1$ is the most recently received measurement signal value, $x_2$ is the previously received measurement signal value, $t_1$ is the time when the most recent measurement signal value was received, and $t_2$ is the time when the previously received measurement signal value was received.

Once the derivative of the digitized DO measurement signal is computed at block 1208, the process 1200 proceeds to block 1210. At block 1210, the process 1200 applies a second filter to smooth the data of a sequence of the digital derivative values. In some embodiments, the filter may comprise a minimal real time filter. In some embodiments, the filter may comprise any other filter that is configured to smooth the data of the sequence of digital derivative values. The second filter may be applied to reduce noise that may exist in the derivative signal. Once the filter is applied to the sequence of digital derivative values, the process 1200 proceeds to block 1212.

At block 1212, the process 1200 determines if the computed derivative value is greater than a threshold value. The comparison of the derivative value with the threshold value may actually comprise a comparison of an absolute value of the derivative value with the threshold value. This comparison may be used to identify whether the DO measurement signal is being influenced by measurement artifacts from oxygen bubbles that have impacted or adhered to the DO probe. In some embodiments, this threshold value may be a parameter that is user defined. In some embodiments, the threshold value may be a parameter that is determined based on a selection or average of previously acceptable DO measurement values.

In most aqueous applications where DO is being measured, the actual DO value changes very slowly. Accordingly, DO measurement signals or values should change at a corresponding rate. Thus, a sudden increase in the magnitude of the DO measurement's rate-of-change (e.g., the computed derivative value) is more likely due to bubble effects and not the true process DO value. If the absolute value of the derivative value exceeds the threshold value then an oxygen bubble has likely struck or adhered to the DO probe and the last DO probe output value may be held constant (e.g., continuously output) until the measurement artifact caused by the bubble has passed. Thus the threshold value may trigger a DO probe output hold until the "bubble event" has passed. If the absolute value of the computed derivative value is greater than the threshold value, then the process 1200 proceeds to block 1214. If the absolute value of the computed derivative value is less than or equal to the threshold value, then the process 1200 proceeds to block 1220.

At block 1214, the process 1200 sets a time delay value for a delay countdown timer and starts the timer. The time delay timer may control when the hold of the DO probe output ends. The timer may count down from the time delay to "0" (or from "0" to the time delay value, or similar). The DO probe output hold may only release when the absolute value of the derivative value is below the threshold value AND the timer is done counting. The timer may count in seconds or in some fraction or multiple of seconds. In some embodiments, the time delay may be between 1 and 300 seconds. In some embodiments, the time delay value is, is less than, or is more than 1, 5, 10, 15, 20, 25, 30, 35, 40, 45, 50, 55, 60, 90, 120, 150, 180, 210, 240, 270, 300, 360, 420, or more seconds, or is a range of any two of the proceeding values, for example 5 to 300, 5 to 180, or 5 to 420 seconds. In some embodiments, the time delay duration may be a parameter that is user determined. For example, a user may determine an optimum setting would likely be in the range of 1-120 seconds for a DO sensor in a bioprocess cell-culture bioreactor. Such a time delay may account for the time from the initial identification of the oxygen bubble, a time when there is a momentary "pause" in the derivative caused by the bubble sliding free of the sensing surface, and a brief period of measurement instability when the derivative falls to pre-bubble oxygen levels. Thus, the timer imposed time-delay may help ensure that the DO probe output waits out all the effects of the bubble event and only then begins outputting new DO measurement signal value. Once the time delay is set and the timer is started, the process 1200 proceeds to block 1216.

At block 1216, the process 1200 holds the last DO probe output (the output value is the same as the previous output value, e.g., continuously output or repeated) and proceeds to block 1218, where the process 1200 discards the current digital measurement signal value. Once the current digital measurement signal value is discarded, the process 1200 ends at block 1230. These events (1216 and 1218) could be performed in any order. For example, the current digital measurement signal value could be discarded prior to repeating or holding the DO probe output. In some embodiments, these events (1216 and 1218) may be combined into a single block.

When the process 1200 determines that the derivative value does not exceed the threshold at block 1212, the process 1200 proceeds to block 1220. At block 1220, the process 1200 determines if the timer started in block 1214 is still counting or operating (e.g., is the time value still above "0" when counting down from the time delay value or less than the time delay value when counting up from "0"). If the timer is still counting, then the process 1200 proceeds to block 1222. At block 1222, the last DO probe output is held before the process 1200 proceeds to block 1224 where the current digital measurement signal value is discarded before terminating at block 1230. These events (1222 and 1224) could be performed in any order. For example, the current digital measurement signal value could be discarded prior to repeating or holding the last DO probe output. In some embodiments, these events (1222 and 1224) may be combined into a single block.

If the process 1200 determines, at block 1220, that the timer started in block 1214 is no long counting, then the process 1200 proceeds to block 1226. At block 1226, the process 1200 may apply a final filter that removes any signal step-changes created when the DO probe output hold is released. In some embodiments, the degree or type of filtering may be user defined. Once the final filter is applied at block 1226, the process 1200 proceeds to block 1228, where the filtered digital measurement signal value is output by the DO probe. Once the filtered digital measurement signal value is output, the process 1200 ends at block 1230. In some embodiments, the process 1200 may be applied on a point-by-point or measurement-by-measurement basis in real time. In some embodiments, these events (1226 and 1228) may be combined into a single block. In some embodiments, one or more of filtering steps of blocks 1206, 1210 and 1226 are excluded from the process 1200.

Figure 13:
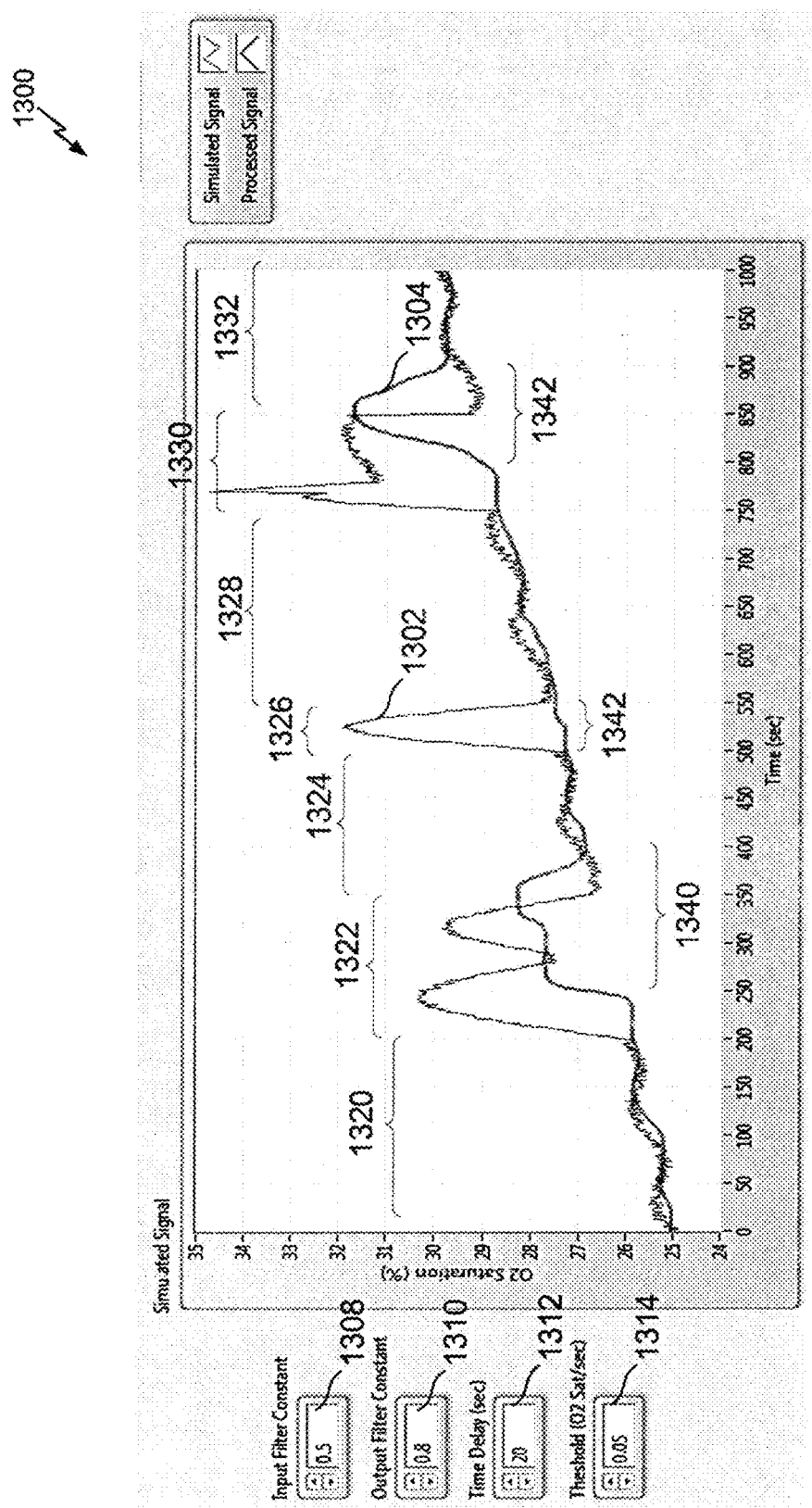
FIG. 13 shows a graph depicting an example of a simulated filtered and an unfiltered measurement signal, the filtered signal filtered according to the process described in FIG. 12.

FIG. 13 shows a graph depicting an example of a simulated filtered and an unfiltered measurement signal, the filtered signal filtered according to the process described in FIG. 12. Line 1302 corresponds to the unfiltered DO measurement signal. Line 1304 corresponds to the filtered and output DO measurement signal. As can be seen from comparing the lines 1302 and 1304, 1304 includes fewer variations than line 1302 and is smoother. Accordingly, outputs associated with the filtered DO measurement signal of line 1304 may be much smoother and consistent and may be filtered against the measurement artifacts that may be caused by bubbles impacting or adhering to the DO probe.

Additionally, FIG. 13 depicts user options that may be used to control the filtering applied by the processor 204 or instruction module 208 of FIG. 2. For example, the user may control an input filter constant via controls 1308, an output filter constant via controls 1310, a maximum delay (in seconds) via controls 1312, and an oxygen saturation per second via threshold 1314. In addition, or alternatively, to these user adjustable parameters, the user may control a signal rate of change threshold, which specifies the threshold above which the DO probe response is held constant until the rate of change (e.g., the measurement value rate of change) drops below the threshold value. Additionally, or alternatively, the user may control a time delay setting, which specifies the time the sensor output is held constant after the (DO measurement) rate of change has exceeded the threshold but then dropped below the threshold. Additionally, or alternatively, the user may control a final output filter constant, which may specify the amount of filtering to apply to the signal after the process 1200 has processed the DO measurement signal. Accordingly, the process 1200 may be a user tunable filter that may be used to filter out the effects of the measurement artifacts caused by bubbles impacting or adhering to the DO probe.

As shown, line 1302 begins at time 0 in a relatively "calm" period 1320 during which the $O_2$ saturation fluctuates within a range of less than 1% over the course of approximately 200 seconds. This may correspond to a period of time when the DO probe is not subject to any bubble impacts or adhesions. Line 1302 shows a period 1322 during which the DO probe is subjected to multiple bubble impacts within a short period of time. The first bubble impact during the period 1322 occurs between approximately 200 seconds and 250 seconds. During the impact, $O_2$ saturation increases rapidly at a greater rate than shown during the period 1320 to a maximum $O_2$ saturation level of over 30%. The $O_2$ saturation then begins to fall back toward the levels seen during the period 1320 before the DO probe is impacted by a second bubble at approximately 240 seconds that causes the $O_2$ saturation measured by the DO probe to again rise to approximately 30% saturation before falling to $O_2$ saturation levels less than 27%. During a period 1324, the $O_2$ saturation level maintains at a level of approximately 27% until the 500 second time. Between 500 seconds and 550 seconds, during a period 1326, the DO probe is impacted by a single bubble that again causes the $O_2$ saturation as measured by the DO probe to spike at approximately 32% saturation. At 550 seconds, after the bubble passes from the DO probe, the $O_2$ saturation level drops to a relatively constant level of between 28 and 29% saturation, duration a period 1328. At a period 1330, the $O_2$ saturation rises to a level of over 34% before dropping, temporarily to a level of between 31 and 32% before again dropping to a pre-bubble measurement level of approximately 29%. The spike to over 34% may correspond to a bubble impact, while the temporary leveling-off at between 31 and 32% may correspond to a bubble adhesion. Accordingly, the periods 1322, 1326, and 1330 are examples of different bubble artifacts, e.g., a double bubble impact, a single bubble impact, and a bubble strike and adhesion, respectively. Line 1304 has corresponding periods 1340, 1342, and 1344, which show the filtered output post processing by the process 1200 for each of the bubble artifact periods 1322, 1326, and 1330 of line 1302. As seen by comparing these periods, the process 1200 does reduce the measurement artifacts caused by the bubble impacts and adhesions. Though the relatively constant periods 1320, 1324, 1328, and 1332 are shown to gradually increase from approximately 25% to 30% $O_2$ saturation, in some embodiments, the $O_2$ saturation level across all of these constant periods may be near constant or with less variation.

Figure 14:
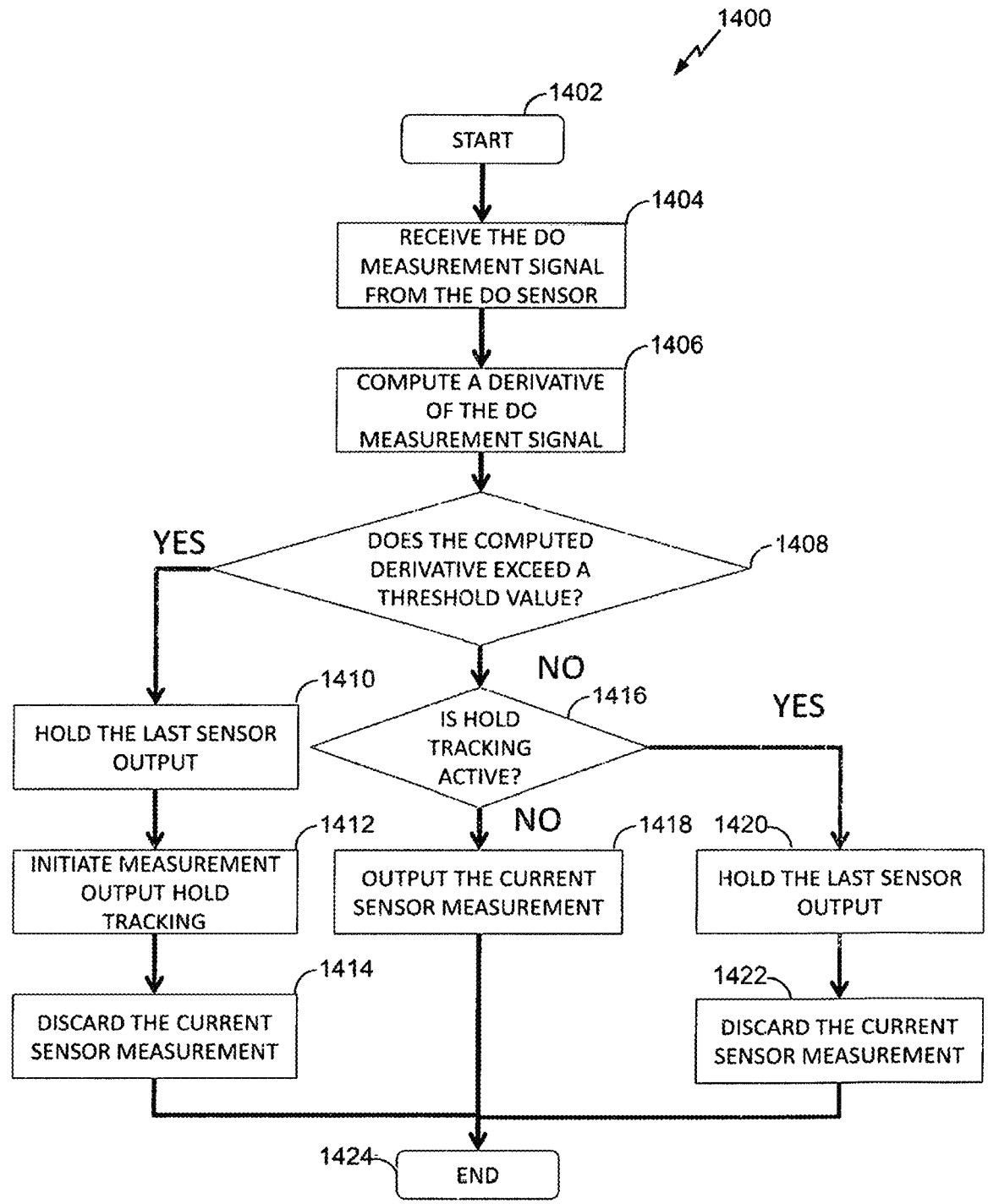
FIG. 14 shows a simplified flowchart of the process of FIG. 12.

FIG. 14 shows a flowchart of another process 1400 that may be implemented to reduce measurement artifacts caused by bubbles that impact or adhere to the sensing surface of the DO probe. The process 1400 is a simplified version of the process 1200 described in FIG. 12. Accordingly, similar blocks will not be fully described again here. In some embodiments, the process 1400 depicted in FIG. 14 may be implemented by one or more of the components disclosed herein in relation to FIG. 2. For example, the process 1400 may be configured to be stored in the memory 206 or the instruction module 208 and may be configured to be implemented by one or more of the processor 204 or the instruction module 208. In some embodiments, the process 1400 may be stored in another component not shown in FIG. 2 and may be implemented by a component not shown in FIG. 2. The process 1400 may be performed for each DO measurement value received from the DO sensor of the DO probe.

As shown in FIG. 14, the process of reducing measurement artifacts may be altered or simplified to reduce filtering steps, etc., that may be application specific. Additionally, the timer of the process 1200 may be replaced by another method of tracking the derivative values. For example, when the process 1400 determines that the computed derivative value exceeds a threshold value at block 1408, the process 1400 proceeds to block 1410, where the last DO probe output is held. Once the last DO probe output is held at block 1410, the process 1400 proceeds to block 1412, where DO probe output hold tracking begins. The output hold tracking may correspond to the countdown timer of process 1200. Alternatively, the output hold tracking may comprise a system that monitors the received measurement signal and analyzes the received signal values to determine when the DO probe is experiencing a measurement artifact. In some embodiments, the hold tracking may comprise a process that monitors the derivative values and identifies when the absolute value of the derivative value has reached its peak value and has fallen back to "normal" values that are not affected by an oxygen bubble. For example, the DO probe output hold tracking may compare the received measurement signal value with an averaged signal of previously received measurement signal values to determine whether the DO probe is currently experiencing a measurement artifact. Accordingly, the hold tracking may comprise any method or manner of determining that the probe is experiencing a measurement artifact. In some embodiments, the hold tracking for monitoring the derivative values may comprise various calculations and comparisons of the derivative values in relation to derivative values prior to the bubble event.

Once the hold tracking is initiated at block 1412, the process 1400 proceeds to block 1414, where the current sensor measurement value is discarded before the process 1400 ends at block 1400. When the process 1400 determines that the computed derivative value does not exceed the threshold value at block 1408, the process 1400 proceeds to block 1416. At block 1416, the process 1400 determines if the hold tracking is active. If the hold tracking is active, the process 1400 proceeds to block 1420, where the last DO probe output is held and the current sensor measurement value is discarded at block 1422 before the process 1400 ends at block 1424. If the hold tracking is not active, then the process 1400 outputs the current sensor measurement value and ends at block 1424.

Figure 15:
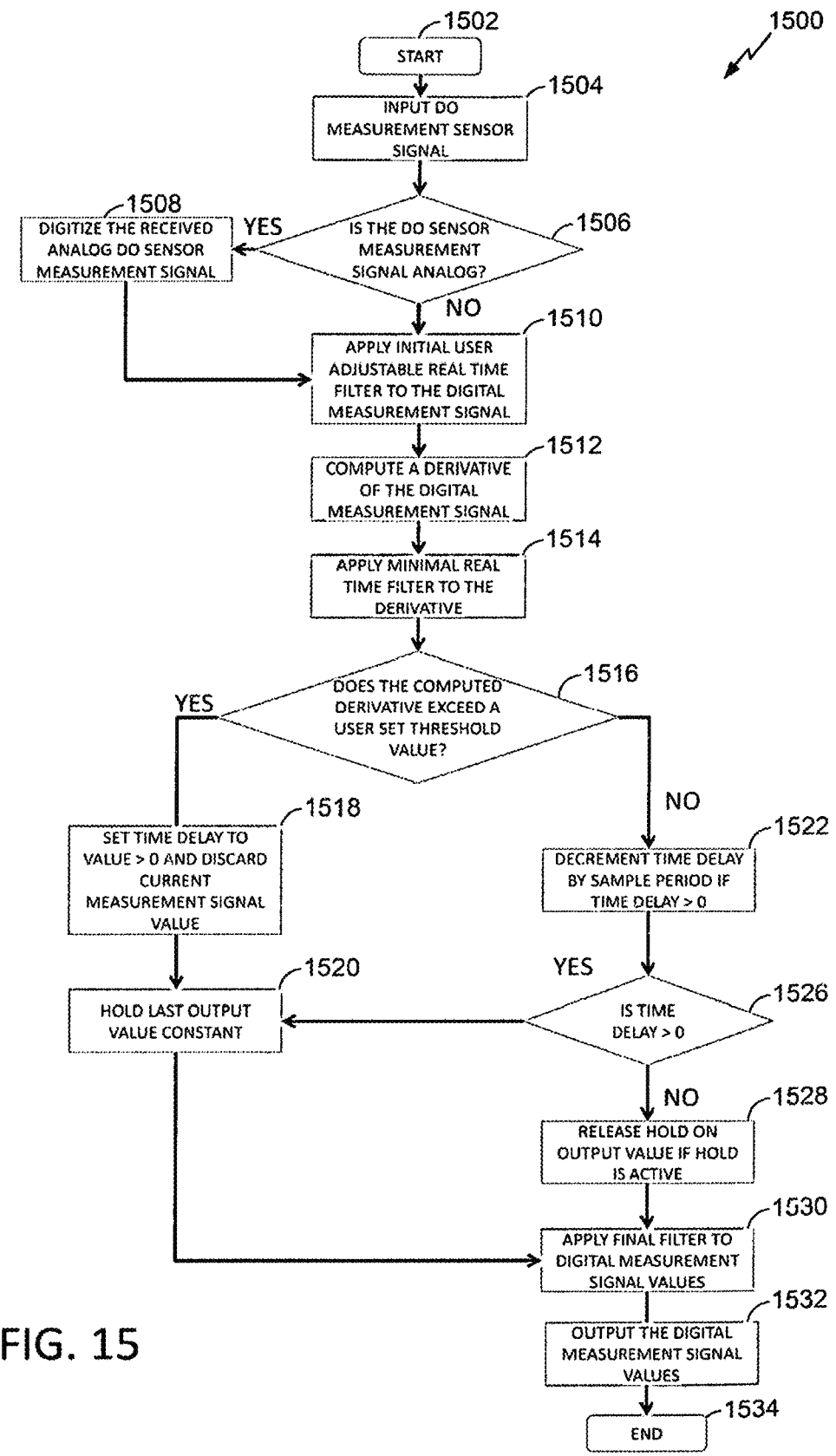
FIG. 15 depicts an example of a flowchart of a process that may be implemented to reduce measurement artifacts caused by bubbles that impact or adhere to the sensing surface of the DO probe.

FIG. 15 depicts a flowchart of another process 1500 that may be implemented to reduce measurement artifacts caused by bubbles that impact or adhere to the sensing surface of the DO probe. In some embodiments, the process 1500 depicted in FIG. 15 may be implemented by one or more of the components disclosed herein in relation to FIG. 2. For example, the process 1500 may be configured to be stored in the memory 206 or the instruction module 208 and may be configured to be implemented by one or more of the processor 204 or the instruction module 208. In some embodiments, the process 1500 may be stored in another component not shown in FIG. 2 and may be implemented by a component not shown in FIG. 2. The process 1500 may be performed for each DO measurement value or a signal comprising multiple measurement values received from the DO sensor of the DO probe. The process 1500 may be used to process values from the DO sensor and output them to a control system, etc. to which the DO probe is connected.

The process 1500 begins at block 1502 and proceeds to block 1504. At block 1504, the process 1500 receives an analog or digital measurement signal from the measurement sensor (e.g., the DO, $CO_2$, or optical pH measurement sensor described herein) and proceeds to block 1506. At block 1506, the process 1500 determines whether the measurement signal received is analog or digital. If the block 1506 determines that the measurement signal is analog, the process 1500 proceeds to block 1508. If the block 1506 determines that the measurement signal is digital, the process 1500 proceeds to block 1510. At block 1508, the process 1508 converts the analog measurement signal into a digital signal, for example via an analog to digital converter (ADC). The process 1500 then proceeds to block 1510. In some embodiments, the process at 1506 and 1508 is not included because the signal received is known to be digital.

At block 1510, the process 1500 applies an initial filter to the digital signal. In some embodiments, the filter may be a low-pass filtering method used to reduce high frequency noise. In some embodiments, the value of filtering or the method of filtering may be user defined or selectable. Once the digital signal is filtered, the process 1500 proceeds to block 1512. In some embodiments, the initial filter at 1510 is not included, or the value of filtering selected is such that no filtering takes place.

At block 1512, the process 1500 computes or determines a derivative value to identify a rate of change of the digital signal (similar to block 1208 of process 1200). The derivative value may be used to identify the amount of change of the digital signal over a period of time. The derivative value of the digital signal may be a continuous output signal of derivative values, with each individual derivative value of the signal corresponding to the result of a newly received digital signal value. Once the derivative value is determined, the process 1500 proceeds to block 1514.

At block 1514, the process 1500 applies a filter to the derivative signal. In some embodiments, the type and/or amount of filtering may be determined or selected by the user. Once the filter is applied to the derivative signal, the process 1500 proceeds to block 1516. In some embodiments, the filter at 1514 is not included, or the value of filtering selected is such that no filtering takes place.

At block 1516, an absolute value of the derivative value is compared with a threshold value. In some embodiments, the threshold value may be user set or selected. If the absolute value of the derivative value is greater than the threshold value, then the process 1500 proceeds to block 1518. If the absolute value of the derivative value is less than the threshold value, then the process 1500 proceeds to block 1522.

At block 1518, the process 1500 sets a time delay value to a positive integer. In some embodiments, the time delay value may be a user defined or selectable parameter. Once the time delay value is set to the positive integer (e.g., value>0), the process 1500 proceeds to block 1520.

At block 1520, the process 1500 proceeds to initiate or maintain a hold of a last output value of the DO probe. In some embodiments, the hold may cause the DO probe to output an average value of a number of previous DO probe output values. While the hold is active or engaged, the current digital measurement value (e.g., the digital signal value most recently received when the derivative value exceeds the threshold value) is discarded. The process 1500 then proceeds to send the last measurement value (e.g., most recent measurement value whose derivative value did not exceed the threshold value) to block 1528.

At block 1528, the last measurement value, which replaced the current digital measurement value, is filtered by a final filter. In some embodiments, the final filter may be user settable or selectable. Once the final filter is applied to the replaced current digital signal value, the process 1500 proceeds to block 1530, where the filtered value is output by the DO probe. In some embodiments, the filter at 1528 is not included, or the value of final filtering selected is such that no final filtering takes place.

As described herein, when the derivative value does not exceed the threshold value, the process 1500 proceeds to block 1522. At block 1522, the process 1500 determines if the time delay value is greater than zero. If the time delay value is greater than zero, then the process 1500 decrements the time delay value by a sample period of the DO probe. For example, if the processor is sampling the DO probe measurements every second, the sample period is one second, and the time delay value would be decreased by 1 second. If the processor is sampling the DO probe measurement every 5 seconds, the sample period is 5 seconds, and the time delay value would be decreased by 5 seconds. In some embodiments, the sample period is set by the user. In some embodiments, the sample period is from 1 to 120, or from 1 to 600, or from 1 to 1800. The process 1500 then proceeds to block 1524.

At block 1524, the process 1500 rechecks the time delay value. If the time delay value is still greater than zero, then the process 1500 proceeds to block 1520 and repeats blocks 1520, 1528, and 1530. Accordingly, the digital signal values corresponding to derivative values that do not exceed the threshold value but that are received while the time delay is greater than zero are discarded and replaced by the replaced current digital signal value. Thus, the output of the DO probe is maintained or held at a steady value while the derivative value exceeds the threshold value and/or the time delay value is greater than zero. At block 1524, when the time delay is no longer greater than zero the process 1500 proceeds to block 1526. At block 1526, the process 1500 proceeds to release the hold if the hold was previously active. The process 1500 then proceeds to block 1528, where the current digital signal value is filtered by the final filter. This filter may be used to minimize any step-changes that may be created when the hold is released. The process 1500 then proceeds to block 1530, where the filtered value is output by the DO probe before the process 1500 ends at block 1532. As discussed, in some embodiments, the filter at 1528 is not included, or the value of final filtering selected is such that no final filtering takes place.

In some embodiments, the various user settable and/or selectable parameters of the filter may be set individually by the user or may be set as a group of one or more parameters via one or more parameter files. In some embodiments, instructions may be implemented to count and track a number of hold-events (e.g., holds at block 1520) and time delay events (e.g., at block 1518) and shift from one specified file having a first set of parameters to another file having a second set of parameters when a user specified event limit has been exceeded (e.g., a limit on the number of holds, or time delay events). In some embodiments, the time delay value described herein may be quantified in seconds or in some fraction or multiple of seconds (or any other measure of time). In some embodiments, the time delay value may be between 1 and 300 seconds. In some embodiments, the time delay value may be user determined and/or settable. For example, a user may determine an optimum setting for the time delay value would likely be in the range of 1-120 seconds for a DO sensor in a bioprocess cell-culture bioreactor. In some embodiments, the time delay value is, is less than, or is more than 5, 10, 15, 20, 25, 30, 35, 40, 45, 50, 55, 60, 90, 120, 150, 180, 210, 240, 270, 300, 360, 420, or more seconds, or is a range of any two of the proceeding values, for example 5 to 300, 20 to 180, or 30 to 420 seconds.

Such a time delay value may be utilized to maintain the DO probe output hold in the event of a momentary dip of the absolute value of the derivative value below the threshold value that is followed by an immediate return to an absolute value of the derivative value that exceeds the threshold value again. For example, when a bubble strikes a sensing surface, the derivative value exceeds the threshold value and the filter engages and holds the last known DO probe output value. When the bubble slides free of the sensing surface, there is a momentary "pause" in the derivative signal (derivative or signal rate of change=0). After this momentary pause, the digital signal starts to return to the DO value of the surrounding media, and in the process, the derivative value once again exceeds the threshold value until the sensor reaches its new point of equilibrium at the pre-bubble event oxygen level.

The time delay ensures that the filter does not disengage during the brief pause in the middle of the bubble event. Thus, the time delay value may help ensure that the hold on the DO probe output is maintained at least as long as all the effects of the bubble event, and only after the event is over does the DO probe begin outputting new digital signal values. In some embodiments, the blocks described herein could be in any order. For example, the current digital signal value may be discarded prior to repeating or holding the last DO probe output. Additionally, or alternatively, one or more of the blocks described herein may be optional or unnecessary.

Figure 16:
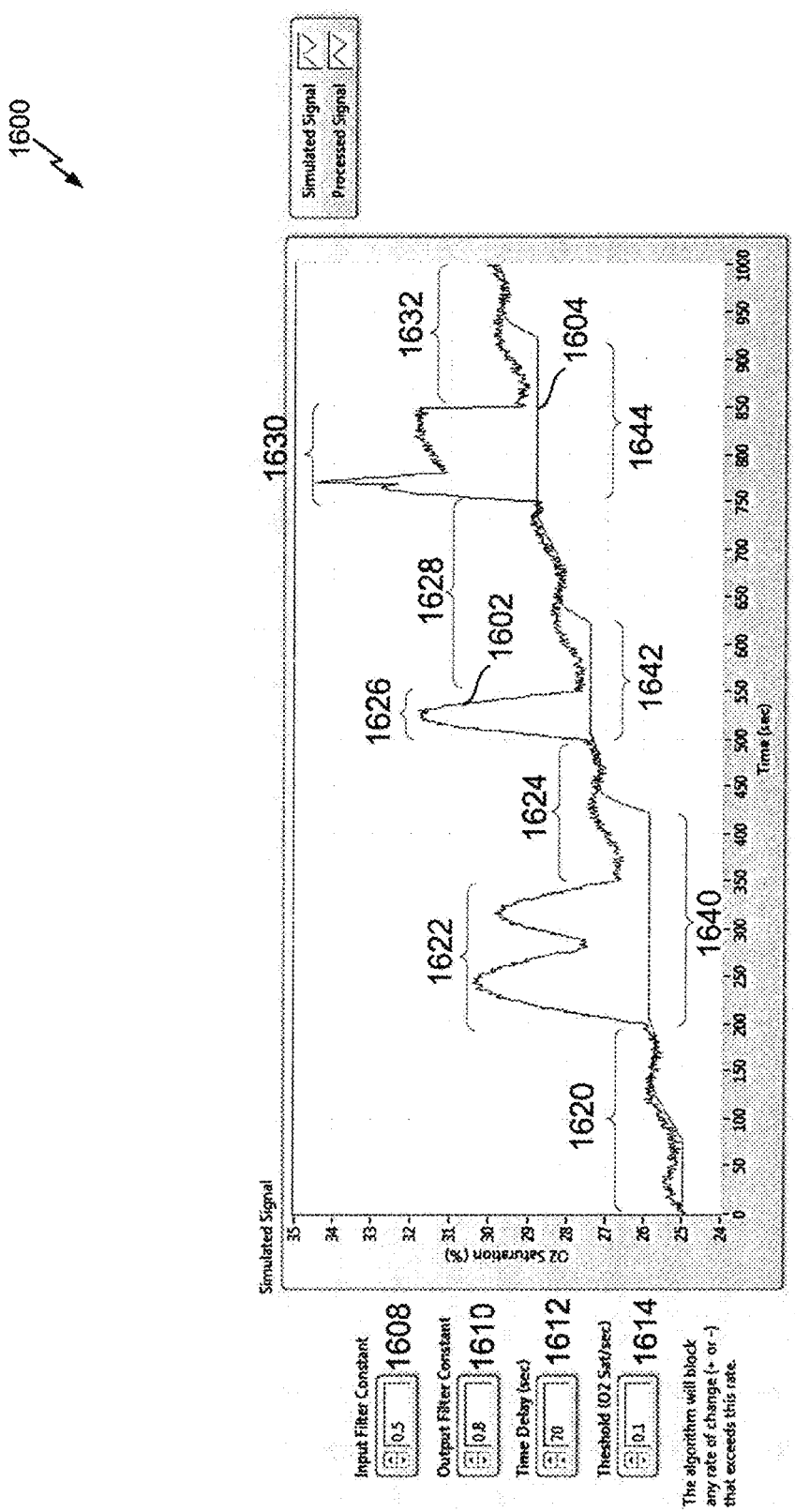
FIG. 16 shows a graph depicting an example of a filtered and an unfiltered measurement signal, the filtered signal filtered according to the process described in FIG. 15.

FIG. 16 shows a graph depicting an example of a filtered and an unfiltered measurement signal, the filtered signal filtered according to the process described in FIG. 15. Line 1602 corresponds to the unfiltered DO measurement signal. Line 1604 corresponds to the filtered and output DO measurement signal. As can be seen from comparing the lines 1602 and 1604, 1604 includes fewer variations and jumps than line 1602. Accordingly, outputs associated with the filtered DO measurement signal of line 1604 may be much smoother and consistent and may be filtered against the measurement artifacts (discussed in more detail below) that may be caused by bubbles impacting or adhering to the DO probe. As shown, the line 1604 shows level portions through a portion of the spikes of line 1604 (discussed in more detail below). These level portions may be caused by the process 1500 described herein in relation to FIG. 15.

Additionally, FIG. 16 depicts user options that may be used to control the filtering applied by the processor 204 or instruction module 208 of FIG. 2. For example, the user may control an input filter constant via controls 1608, an output filter constant via controls 1610, a maximum time delay (in seconds) via controls 1612, and a not-to-exceed rate-of-change (absolute value of derivative) threshold for the change in oxygen % saturation per minute via controls 1614. By means of the user adjustable value 1614, the user may control a rate-of-change threshold, which specifies the threshold above which the DO probe response is held constant until the rate-of-change (e.g., the measurement value rate-of-change) drops below the threshold value. Additionally, or alternatively, the user may control a time delay setting, which specifies the time the sensor output is held constant after the (DO measurement) rate-of-change has exceeded the threshold value but then dropped below the threshold value. Additionally, or alternatively, the user may control a final output filter constant, which may specify the amount of filtering to apply to the signal after the process 1500 has processed the DO measurement signal. Accordingly, the process 1500 may be a user tunable filter that may be used to filter out the effects of the measurement artifacts caused by bubbles impacting or adhering to the DO probe. One or more of these values 1608-1614 may correspond to the filter selections or hold delay values described herein. In some embodiments, the hold delay values may not be sufficient to completely eliminate the measurement artifacts caused by adhering bubbles. However, with the addition of the various shaped caps described herein, adhering bubbles are greatly minimized or reduced, thus allowing for a reduction of the associated hold delay values.

As shown, line 1602 begins at time 0 in a relatively "calm" period 1620 during which the $O_2$ saturation fluctuates within a range of less than 1% over the course of approximately 200 seconds. This may correspond to a period of time when the DO probe is not subject to any bubble impacts or adhesions. Line 1602 shows a period 1622 during which the DO probe is subjected to multiple bubble impacts within a short period of time. The first bubble impact during the period 1622 occurs between approximately 200 seconds and 250 seconds. During the impact, $O_2$ saturation increases rapidly at a greater rate than shown during the period 1620 to a maximum $O_2$ saturation level of over 30%. The $O_2$ saturation then begins to fall back toward the levels seen during the period 1620 before the DO probe is impacted by a second bubble at approximately 280 seconds that causes the $O_2$ saturation measured by the DO probe to again rise to approximately 30% saturation before falling to $O_2$ saturation levels less than 27%. During a period 1624, the $O_2$ saturation level maintains at a level of approximately 27% until the 500 second time. Between 500 seconds and 550 seconds, during a period 1626, the DO probe is impacted by a single bubble that again causes the $O_2$ saturation as measured by the DO probe to spike to approximately 32% saturation. At 550 seconds, after the bubble passes from the DO probe, the $O_2$ saturation level drops to a relatively constant level of between 28 and 29% saturation, during a period 1628. At a period 1630, the $O_2$ saturation rises to a level of over 34% before dropping, temporarily to a level of between 31 and 32% before again dropping to a pre-bubble measurement level of approximately 29%. The spike to over 34% may correspond to a bubble impact, while the temporary leveling-off at between 28 and 29% may correspond to a bubble adhesion. Accordingly, the periods 1622, 1626, and 1630 are examples of different bubble artifacts, e.g., a double bubble impact, a single bubble impact, and a bubble strike and adhesion, respectively. Line 1604 has corresponding periods 1640, 1642, and 1644, which show the filtered output post processing by the process 1500 for each of the bubble artifact periods 1622, 1626, and 1630 of line 1602. As seen by comparing these periods, the process 1500 reduces the measurement artifacts caused by the bubble impacts and adhesions to a more steady level than the process 1200 (shown in FIG. 13). Thus, the process 1500 is shown to be more effective at reducing the measurement artifacts of bubble impacts and adhesions as compared to the process 1200. Though the relatively constant periods 1620, 1624, 1628, and 1632 are shown to gradually increase from approximately 25% to 30% $O_2$ saturation, in some embodiments, the $O_2$ saturation level across all of these constant periods may be near constant or with less variation.

In some embodiments, the various features described herein may be integrated with a smart probe. For example, the DO probe could be a smart probe that is further configured to comprise a bubble filter described herein. In some embodiments, the smart DO probe may be configured to integrate the bubble filter within the smart probe (or similar) memory. For example, the bubble filter functionality of the smart DO probe may be set or calibrated at a first device or location before being moved for use with a second device or at a second location. Thus, the smart DO probe may allow a user to configure and set up the bubble filter in one location for use at another location.

In some embodiments, the bubble filter and associated instructions described herein may be further configured to track a number of "bubble events." A bubble event may be defined as an instance when a sparged bubble impacts and/or adheres to the DO probe and causes the DO measurement signal to experience a measurement artifact caused by the sparged bubble. As each time the bubble impacts or adheres to the DO probe may cause a new measurement artifact (i.e., measurement signal spike or drop), a quantity of bubble impacts or adherences may be associated a number of bubble impacts or bubble events. For example, as described in relation to process 1500 and FIG. 15, a number of times the time delay value is started may correspond to the number of bubble events.

Based on the number of bubble events, the user set or adjustable values for the processes 1200 and 1500 (for example) described herein may be varied. For example, if the number of bubble events is less than or equal to a user set or adjustable threshold amount for the number of bubble events, then the user set or adjustable values for the processes 1200 and 1500 (for example) may be set to a first parameter set (e.g., a first delay value of 20 seconds). Alternatively, if the number of bubble events is greater than the user set or adjustable threshold amount for bubble events, then the user set or adjustable values for the processes 1200 and 1500 (for example) may be set to a second parameter set (e.g., a time delay value of 120 seconds). Accordingly, the variable parameter sets based on the number of bubble events allows the bubble filter to change or adapt as the process being measured changes over time. For example, as a bioprocess in a bioreactor is monitored with the DO probe, the number of bubble events may increase as the bioprocess changes or advances over time. This may occur because greater oxygen feed rates are needed in later bioprocess stages, thus requiring additional sparging that introduces additional bubbles to the sample. The additional bubbles increase the number of bubble events (e.g., more bubbles leads to more bubble impacts or adherences). Accordingly, the user set or adjustable values for the bubble filter may need to be adjusted as the bioprocess advances to account for increased quantities or frequencies of bubble impacts so as to adjust how the bubble timer reacts to the additional impacts. For example, the bubble filter may reduce or increase the time delay value as the frequency or quantity of bubble events increases.

In some embodiments, the bubble filter may be activated or deactivated as determined by the user. Accordingly, the user may activate and/or deactivate the bubble filter as often or little as they judge necessary to maintain control of the process application. In some embodiments, the user may control activation or deactivation of the bubble filter using a control of the probe. In some embodiments, the user may place the activation and deactivation of the bubble filter in an automatic mode by which the DO probe or a centralized controller can control the activation of the bubble filter.

In some embodiments, some portions of the bubble filter are always active and generating useful data, even if the filter is deactivated by the user (e.g., not filtering the DO probe output). In some embodiments, even if the bubble filter is deactivated by the user, the filter program is still actively detecting bubble events and the number of these bubble events may be totalized or otherwise transformed by the DO probe. The number of these bubble events may correspond to a value called an aeration intensity measurement (AIM) value. In some embodiments, when the bubble filter is activated (e.g., is filtering the DO probe output), the AIM value may correspond to an amount or percentage of time in a user set time interval that the bubble filter has the DO probe output on hold. In some embodiments, even if the filter is deactivated, the AIM value continues to be calculated as the amount or percentage of time in the user set time interval that the bubble filter would have the DO probe output on hold if the filter were activated. In some embodiments, the AIM value is continuously updated whether the bubble filter is activated or deactivated. In this way, the AIM value may be a useful tool for the user to judge or determine whether to activate or deactivate the bubble filter and what the process control consequences of activating or deactivating the bubble filter would likely be. The AIM value also enables the user to see what the effects would be on the DO probe output for various bubble filter parameter changes without having the bubble filter activated. In this way the bubble filter can be tuned to the process before it is activated. For example, if the user set time interval is twenty minutes and the bubble filter has the DO probe output on hold for twelve minutes of that twenty minute interval, then the calculated AIM value for the filter may be 0.6 or 60%. In some embodiments, the user may determine to activate or deactivate the bubble filter based on the AIM value. For example, if the AIM value is within a desirable or acceptable range, then the user may determine to activate the bubble filter or continue to keep the bubble filter activated. If the AIM value is too high, then the user may determine to deactivate the bubble filter if it is active or keep it deactivated. If the AIM value is too low, then the user may determine that the bubble filter is not needed and may choose to not activate the bubble filter or deactivate the bubble filter if already active. In some embodiments, even when the bubble filter is not activated, the bubble filter may be performing its calculations or otherwise proceeding with its programmed operation as if it were still controlled to hold the DO probe output and keeping track of bubble events and tentative DO probe output hold time even though not actively filtering the DO probe output or actively holding the output for any amount of time. In this way the AIM value can become a constant measurement that corresponds to bubble activity in the process application and/or a measurement of bubble filter activity or potential bubble filter activity. In some embodiments, when the bubble filter is active, the bubble filter and/or the DO probe may be configured to output both the unfiltered DO probe output and the filtered DO probe output. Accordingly, the user may view both the filtered DO probe output and the unfiltered DO probe output at any time. Such combined viewing may allow the user to determine when the bubble filter is providing benefit or when it is not needed by comparing the effect the bubble filter in view of the unfiltered data.

In some embodiments, in addition to determining whether to activate or deactivate the bubble filter, the user may utilize the AIM value, the filtered DO probe output, the unfiltered DO probe output, or any combination thereof to identify or select a parameter of the bubble filter that may be adjusted to change the operation of the bubble filter. For example, if the user determines that the AIM value is too high, the user may adjust one of the rate of change threshold (i.e., increasing the rate of change threshold) or the time delay setting (i.e., reducing the time delay setting). By adjusting one of the parameters of the bubble filter, the user may increase or reduce the amount of time the bubble filter holds the DO probe output. Bubble interference of the DO probe can complicate the process control of the process application. However, long hold times of the DO probe output can also complicate the process control. By means of the AIM value and a view of the filtered and unfiltered DO probe output, the user can set bubble filter parameters to values that optimize the DO probe performance in that specific process application.

In some embodiments, the AIM value may be used for automated control of the activation or deactivation of the bubble filter. For example, the user may establish user adjustable AIM value thresholds according to which the DO probe may automatically activate or deactivate the bubble filter. For example, an AIM value threshold of 10% hold time to the user-set time interval may be set to trigger or control when the bubble filter activates or deactivates. Through experience or through experiment, the user may find that the bubble filter need only be activated if the AIM value exceeds 10% in a particular application. Similarly, when the AIM value is greater than the AIM filter threshold of 75% hold time to the user-set time interval, then the DO probe may automatically deactivate the bubble filter without requiring user intervention. The user may have found that at AIM values over 75% the bubble filter may negatively impact the process control of the process application. Similarly, when the bubble filter is activated, the AIM filter threshold may be set at 75% or 0.75 and/or 10% or 0.1. Accordingly, if the bubble filter determines that the bubble filter would provide the filtered DO output for an AIM value greater than the 75% AIM value or lower than the 10% AIM value, then the DO probe may be automatically deactivated without user intervention. Alternatively, or additionally, the DO probe may automatically adjust one of the parameters of the bubble filter to reduce or increase the AIM value so that it is maintained in a range optimal to both minimizing bubble effects on the DO sensor and maintaining good process control of the process application. For example, the user established range for the AIM value may be between 10% (lower threshold) and 75% (upper threshold). Alternatively, the lower AIM value threshold may be in the range of 0-50% while the upper AIM value threshold may be in the range of 50-100%. In some embodiments, the lower AIM threshold is, is about, is less than, is less than about, is greater than, is greater than about, is at least, is at least about, is at most, is at most about, or is in a range bounded by any two of, 1%, 5%, 10%, 15%, 20%, 25%, 30%, 35%, 40%, 45%, 50%, 55%, 60%, 65%, 70%, 75%, 80%, 85%, 90%, or 95%. In some embodiments, the upper AIM value threshold is, is about, is less than, is less than about, is greater than, is greater than about, is at least, is at least about, is at most, is at most about, or is in a range bounded by any two of, 5%, 10%, 15%, 20%, 25%, 30%, 35%, 40%, 45%, 50%, 55%, 60%, 65%, 70%, 75%, 80%, 85%, 90%, or 95%. In some embodiments, the user established AIM value range (e.g., lower threshold to upper threshold) may comprise one of the ranges of (1%-50%), (10%-60%), (20%-70%), or a range between any two of the AIM threshold values defined herein.

In some embodiments, the controls described herein may be implemented via local I/O on the probe or sensor (e.g., push-buttons, selectors, digital controls, wireless interface, control module, etc.). In some embodiments, the controls described herein may be implemented via a centralized controller to which the probe or sensor to be controlled is connected or coupled. For example, the probe may be connected to a programmable logic controller or similar controller and may be interfaced with via a touchscreen human-machine interface (HMI) or local control stations (e.g., hardwired or software controlled physical buttons, switches, etc.). In some embodiments, the controls of FIGS. 13 and 16, the activation controls, and the AIM controls may be controlled via the HMI or control stations. Similarly, the functionality performed by the DO probe and/or the bubble filter may be performed by a processor, microprocessor, or similar controller.

The foregoing description details certain implementations of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the development should not be taken to imply that the terminology is being re-defined herein to be restricted to including any specific characteristics of the features or aspects of the technology with which that terminology is associated.

The technology is operational with numerous other general purpose or special purpose computing system environments or configurations. Examples of well-known computing systems, environments, and/or configurations that may be suitable for use with the development include, but are not limited to, personal computers, server computers, hand-held or laptop devices, multiprocessor systems, microprocessor-based systems, programmable consumer electronics, network PCs, minicomputers, mainframe computers, distributed computing environments that include any of the systems or devices described herein, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the implementations disclosed herein may be implemented as electronic hardware, software stored on a computer readable medium and executable by a processor, or combinations of both. To clearly illustrate this interchangeability of hardware and software, various illustrative components, blocks, modules, circuits, and steps have been disclosed herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present development.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It will be appreciated by those skilled in the art that various modifications and changes may be made without departing from the scope of the described technology. Such modifications and changes are intended to fall within the scope of the implementations. It will also be appreciated by those of skill in the art that parts included in one implementation are interchangeable with other implementations; one or more parts from a depicted implementation can be included with other depicted implementations in any combination. For example, any of the various components described herein and/or depicted in the Figures may be combined, interchanged or excluded from other implementations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present development. At the very least, and not as an attempt to limit the application of the doctrine of equivalents to the scope of the claims, each numerical parameter should be construed in light of the number of significant digits and ordinary rounding approaches.

The description herein discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific implementations disclosed herein, but that it cover all modifications and alternatives coming within the true scope and spirit of the development as embodied in the attached claims.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrequited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; and use of terms like 'preferably,' 'preferred,' 'desired,' or 'desirable,' and words of similar meaning should not be understood as implying that certain features are critical, essential, or even important to the structure or function, but instead as merely intended to highlight alternative or additional features that may or may not be utilized in a particular implementation. In addition, the term "comprising" is to be interpreted synonymously with the phrases "having at least" or "including at least". When used in the context of a process, the term "comprising" means that the process includes at least the recited steps, but may include additional steps. When used in the context of a compound, composition or device, the term "comprising" means that the compound, composition or device includes at least the recited features or components, but may also include additional features or components. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

What is claimed is:

1. A measurement device configured to reduce measurement inaccuracies in a sample comprising an aqueous solution, the measurement device comprising:
    a measurement probe comprising a sensor configured to detect a characteristic of the sample and generate a measurement signal based thereon, the sensor comprising a sensing surface positioned on a distal end, the sensing surface configured to be exposed to the sample and configured to facilitate a passing of gas bubbles within the sample away from the sensing surface, the sensing surface being domed or at an angle that is less than 90 degrees to an axis of a length of the measurement device;
    a memory configured to store instructions for applying a filter to the measurement signal; and
    a filtering module configured to process the instructions for applying the filter to the measurement signal to generate a filtered output with reduced measurement inaccuracies due to the gas bubbles within the solution as compared to the measurement signal.

2. The device of claim 1, wherein the filter is a bubble effect filter configured to reduce measurement inaccuracies caused by impacts or adherences of the gas bubbles with the probe.

3. The measurement device of claim 1, wherein the domed or angled sensing surface comprises a replaceable cap.

4. The measurement device of claim 1, wherein the domed or angled sensing surface comprises one of: glass, plastic, or silicone rubber.

5. The measurement device of claim 1, wherein the sensor of the measurement probe is an optical, fluorescence based, gas sensor comprising one or more light emitter and light detector circuits.

6. The device of claim 1, wherein the measurement probe is an electrochemical gas sensor comprising:
    a cathode;
    an anode;

an gas permeable layer positioned to be in contact with the sample; and an electrolyte chamber.

7. The measurement device of claim 1, wherein the measurement probe is configured to measure an amount of dissolved oxygen or dissolved carbon dioxide in the sample.

8. The device of claim 1, wherein the instructions comprise instructions for the filtering module to:

generate a rate of change of the measurement signal; and compare an absolute value of the rate of change to a threshold value.

9. The device of claim 8, wherein the instructions further comprise instructions for the filtering module to:

maintain an output of a previous measurement signal when the generated rate of change is greater than the threshold value; and output the measurement signal when the generated rate of change is less than the threshold value.

10. The device of claim 8, wherein the instructions further comprise instructions for the filtering module to initiate a timer in conjunction with the rate of change and the threshold value, the timer configured to cause the filtering module to release the signal hold after the generated rate of change is less than the threshold value and after a subsequent user-set timer interval has elapsed.

11. The device of claim 10, wherein the instructions further comprise instructions for the filtering module to hold the generated filtered output at a previously output value when the user-set timer interval has not elapsed.

12. The device of claim 8, wherein the instructions comprise one or more user adjustable parameters to tune the filter based on the sample.

13. The device of claim 1, wherein the instructions comprise instructions for the filtering module to count a number of measurement inaccuracy events within a period of time.

14. The device of claim 13, wherein the instructions further comprise instructions for the filtering module to:

compare the number of events to an event threshold value;

set a parameter set for the filtering module to a first set when the number of events is equal to or less than the event threshold value; and set the parameter set of the filtering module to a second set when the number of events is above the event threshold value.

15. The device of claim 1, wherein the measurement probe comprises one of a dissolved oxygen probe, a carbon dioxide probe, or a pH probe.

16. A method for reducing measurement inaccuracies in a measurement probe in a sample comprising an aqueous solution, the method comprising:

detecting, via a sensor, a characteristic of the sample, the sensor comprising a sensing surface positioned on a distal end, the sensing surface configured to be exposed to the sample and configured to facilitate a passing of gas bubbles within the sample away from the sensing surface, the sensing surface being domed or at an angle that is less than 90 degrees to an axis of a length of the measurement device;

generating a measurement signal based on the detected characteristic; and applying, via a filtering module, a filter, stored in a memory, to the measurement signal, the filter configured to generate a filtered output having reduced measurement inaccuracies as compared to the measurement signal, wherein the measurement inaccuracies are caused by gas bubbles within the sample, the sample comprising an aqueous solution.

17. The device of claim 1, wherein the filtering module is configured to identify an amount of time during which the filtered output is generated within a period of time and wherein at least one parameter of the filtering module is adjusted based on the identified amount of time.

18. The method of claim 16, wherein the filter is a bubble effect filter configured to reduce measurement inaccuracies caused by impacts or adherences of the gas bubbles with the measurement probe.

19. A measurement device configured to reduce measurement inaccuracies in a sample, the measurement device comprising:

a measurement probe comprising a sensor configured to detect a characteristic of the sample and generate a measurement signal based thereon;

a memory configured to store instructions for applying a filter to the measurement signal; and a filtering module configured to process the instructions for applying the filter to the measurement signal to generate a filtered output with reduced measurement inaccuracies as compared to the measurement signal, the instructions comprising instructions for the filtering module to:

count a number of measurement inaccuracy events within a period of time;

compare the number of events to an event threshold value;

set a parameter set for the filtering module to a first set when the number of events is equal to or less than the event threshold value; and set the parameter set of the filtering module to a second set when the number of events is above the event threshold value.

* * * * *